United States Patent
Jung et al.

(10) Patent No.: US 10,728,836 B2
(45) Date of Patent: Jul. 28, 2020

(54) METHOD AND DEVICE FOR PROVIDING DATA SERVICE THROUGH MOBILE COMMUNICATION NETWORK

(71) Applicant: Samsung Electronics Co., Ltd., Gyeonggi-do (KR)

(72) Inventors: Ha-Kyung Jung, Seoul (KR); Ki-Suk Kweon, Suwon-si (KR); Ji-Cheol Lee, Suwon-si (KR); Hyung-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 15/526,265

(22) PCT Filed: Nov. 11, 2015

(86) PCT No.: PCT/KR2015/012118
§ 371 (c)(1),
(2) Date: May 11, 2017

(87) PCT Pub. No.: WO2016/076628
PCT Pub. Date: May 19, 2016

(65) Prior Publication Data
US 2017/0332312 A1 Nov. 16, 2017

(30) Foreign Application Priority Data
Nov. 11, 2014 (KR) .................. 10-2014-0156102

(51) Int. Cl.
*H04W 4/00* (2018.01)
*H04W 48/16* (2009.01)
(Continued)

(52) U.S. Cl.
CPC ............. *H04W 48/16* (2013.01); *H04L 12/14* (2013.01); *H04L 12/1407* (2013.01);
(Continued)

(58) Field of Classification Search
CPC ...... H04W 12/08; H04W 48/18; H04W 48/16
See application file for complete search history.

(56) References Cited

U.S. PATENT DOCUMENTS

| 2004/0192251 A1* | 9/2004 | Zhao | H04W 4/90 455/404.1 |
| 2005/0210288 A1* | 9/2005 | Grosse | H04L 63/0272 726/5 |

(Continued)

FOREIGN PATENT DOCUMENTS

| EP | 2790454 A1 | 10/2014 |
| KR | 20120100719 A | 9/2012 |

(Continued)

OTHER PUBLICATIONS

Foreign Communication From a Related Counterpart Application, PCT Application No. PCT/KR2015/012118, International Search Report dated May 23, 2016, 4 pages.
(Continued)

*Primary Examiner* — Omoniyi Obayanju

(57) ABSTRACT

The present disclosure relates to a 5G or pre-5G communication system to be provided to support a higher data transmission rate after a 4G communication system such as LTE. Disclosed is a method and device for providing a data service through a mobile communication network. The method of the present invention comprises the steps of: receiving a connection request message including a device identifier of a terminal which is not subscribed to a mobile communication network; determining, using the device identifier of the terminal, whether the terminal corresponds to a contract for using the mobile communication network; configuring the terminal to perform limited access to the mobile communication network according to the contract when the terminal corresponds to the contract for using the mobile communication network; and transmitting, to the
(Continued)

terminal, a connection acceptance message granting the limited access.

7 Claims, 24 Drawing Sheets

(51) Int. Cl.
| | | |
|---|---|---|
| | *H04W 12/08* | (2009.01) |
| | *H04W 8/20* | (2009.01) |
| | *H04W 12/06* | (2009.01) |
| | *H04W 60/00* | (2009.01) |
| | *H04W 80/10* | (2009.01) |
| | *H04M 15/00* | (2006.01) |
| | *H04L 12/14* | (2006.01) |
| | *H04W 4/24* | (2018.01) |
| | *H04W 12/00* | (2009.01) |

(52) U.S. Cl.
CPC ....... *H04M 15/66* (2013.01); *H04M 15/8214* (2013.01); *H04W 4/24* (2013.01); *H04W 8/20* (2013.01); *H04W 12/06* (2013.01); *H04W 12/08* (2013.01); *H04W 60/00* (2013.01); *H04W 80/10* (2013.01); *H04W 12/00403* (2019.01); *H04W 12/00512* (2019.01)

(56) References Cited

U.S. PATENT DOCUMENTS

| | | | | |
|---|---|---|---|---|
| 2012/0179790 | A1* | 7/2012 | Kim | H04W 8/26 |
| | | | | 709/220 |
| 2013/0316674 | A1 | 11/2013 | Cho et al. | |
| 2014/0198637 | A1* | 7/2014 | Shan | H04W 52/243 |
| | | | | 370/229 |
| 2014/0273968 | A1 | 9/2014 | Agarwal et al. | |
| 2015/0181409 | A1* | 6/2015 | Chang | H04W 8/18 |
| | | | | 455/410 |
| 2016/0028665 | A1* | 1/2016 | Yan | H04W 12/08 |
| | | | | 370/329 |

FOREIGN PATENT DOCUMENTS

| | | |
|---|---|---|
| KR | 20130065878 A | 6/2013 |
| WO | 2011014015 A2 | 2/2011 |
| WO | 2012102594 A2 | 8/2012 |
| WO | 2013085314 A1 | 6/2013 |

OTHER PUBLICATIONS

Foreign Communication From a Related Counterpart Application, PCT Application No. PCT/KR2015/012118, Written Opinion dated May 23, 2016, 11 pages.

* cited by examiner

METHOD AND DEVICE FOR PROVIDING DATA SERVICE THROUGH MOBILE COMMUNICATION NETWORK

CROSS-REFERENCE TO RELATED APPLICATION(S)

This application claims priority under 35 U.S.C. § 365 to International Application No. PCT/KR2015/012118, which was filed on Nov. 11, 2015, and claims a priority under 35 U.S.C. § 119 to Korean Patent Application No. 10-2014-0156102, which was filed on Nov. 11, 2014, the contents of which are incorporated herein by reference.

TECHNICAL FIELD

The present disclosure relates to a method and apparatus for providing a data service to a terminal that does not subscribe to a mobile network operator through a mobile network.

BACKGROUND ART

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

The LTE standards, 4G mobile communication of the $3^{rd}$-Generation Partnership Project (3GPP), support sponsored data connectivity in which a service provider may pay a mobile communication fee for a terminal using a service. In the sponsored data connectivity standards, a sponsor makes a business contract with a mobile network operator and pays a mobile communication fee for a service of a specific application service provider (ASP) used by a subscriber. The sponsor and the ASP may be separate operators or an identical operator. The sponsor or the ASP exchange information about a policy and charging rules function (PCRF), a policy, and charging of an operator network through an application function (AF) of the 3GPP standards.

However, the sponsored data connectivity standards assume that users have already subscribed to a mobile network operator, thus failing to provide a technique for sponsoring a mobile communication fee for users or terminals not subscribing to a mobile communication network operated by the mobile network operator. Considering the recent increasing demands for portable terminals needing sponsored Internet connection, including portable electronic book terminals, the conventional sponsored data connectivity standards, which essentially need subscriptions to mobile network operators, do not sufficiently provide user convenience.

DETAILED DESCRIPTION OF THE INVENTION

Technical Problem

The present disclosure provides a method and apparatus for transmitting and receiving information in a communication system.

The present disclosure provides a method and apparatus for providing a data service through a mobile communication network.

The present disclosure provides a method and apparatus by which a mobile network operator provides a particular data service to a user or a terminal that does not subscribe to a mobile communication network.

Technical Solution

A method for providing a data service through a mobile communication network according to an embodiment of the present disclosure includes receiving an Attach Request message comprising a device identity of a user equipment (UE) which does not subscribe to the mobile communication network, determining, using the device identity of the UE, whether the UE corresponds to a contract for using the mobile communication network, configuring the UE to perform a limited access to the mobile communication network according to the contract if the UE corresponds to the contract for using the mobile communication network, and sending, to the UE, an Attach Accept message allowing the limited access.

A method for providing a data service through a mobile communication network according to an embodiment of the present disclosure includes receiving, from a mobility management entity (MME) of the mobile communication network, a Create Session Request message comprising a device identity of a UE that does not subscribe to the mobile communication network, obtaining policy and charging control (PCC) rules indicating a policy for the UE by using the device identity, applying the PCC rules to a session for the UE to allow the UE to perform a limited access to the mobile communication network, and sending, to the MME, a Create Session Response message indicating that the session for the UE is created.

A method for providing a data service through a mobile communication network according to an embodiment of the present disclosure includes providing an identity of a UE that does not subscribe to the mobile communication network to an equipment identity register (EIR) of the mobile communication network, providing, to a policy and charging rules function (PCRF) of the mobile communication network, a network entity identity for identifying a network entity supporting sponsored data connectivity of the UE, an address to which the UE is attached through the mobile communication network, and information about a quality of service (QoS) profile guaranteed in the mobile communication network, receiving, from the PCRF, a Threshold Reach Notification message comprising a usage data record of the UE, collecting, from the UE, the usage data record collected by the UE, verifying the usage data record collected by the PCRF based on the usage data record collected by the UE, and delivering an Expiration Alert message comprising the usage data record collected by the PCRF to the SP.

A method for providing a data service through a mobile communication network according to an embodiment of the present disclosure includes receiving an Authentication Information Provisioning message comprising information about a subscriber identity of a UE and a group key from a network entity supporting sponsored data connectivity of the UE that does not subscribe to the mobile communication network, receiving an Authentication Information Request message comprising a subscriber identity of the UE from an MME of the mobile communication network, searching for a group key corresponding to the subscriber identity and creating a cipher key and an integrity key by using the group key, and sending an Authentication Information Response message comprising an authentication vector (AV) comprising the cipher key and the integrity key and a network entity identity for identifying the network entity to the MME.

A method for providing a data service through a mobile communication network according to an embodiment of the present disclosure includes sending, to a service provider (SP) through a first mobile communication network to which a UE subscribes, a Status Report message comprising a device identity of the UE, a network identity for identifying at least one mobile communication network searched by the UE, and a geographic location of the UE, receiving, from the SP, a Sponsored Network Announcement message comprising a network identity of a second mobile communication network supporting sponsored data connectivity for the UE and frequency information of the second mobile communication network, configuring attachment to the second mobile communication network by using the device identity of the UE, and sending a Service Request message to the SP through the second mobile communication network.

A method for providing a data service through a mobile communication network according to an embodiment of the present disclosure includes receiving, from an SP, a Token Publishing message comprising a device identity of a UE, an identity of at least one mobile communication networks searched by the UE, and a geographic location of the UE, selecting a first mobile communication network to which attachment of the UE is to be allowed from among the at least one mobile communication networks, providing a device identity of the UE, a list of destination Internet protocol (IP) addresses to which an access of the UE is to be allowed, and a QoS profile to be guaranteed in the UE to the first mobile communication network, and sending an acknowledgement (ACK) message comprising an identity of the first mobile communication network and frequency information needed for attachment to the first mobile communication network to the SP.

A method for providing a data service through a mobile communication network according to an embodiment of the present disclosure includes sending, to an SP, a Subscription Request message comprising an identity of a subscriber authentication module embedded in the UE, an identity of a database in which the subscriber authentication module is registered, and an identity of a first mobile communication network, downloading a profile of a second mobile communication network to which the UE does not subscribe from a network entity supporting sponsored data connectivity for the SP, sending a Log-in Request message comprising an identity of the second mobile communication network to the SP, activating the profile of the second mobile communication network while activating the profile of the first mobile communication network, and sending a Log-in Response message comprising an identity of the second mobile communication network and frequency information to the SP through the first mobile communication network.

A method for providing a data service through a mobile communication network according to an embodiment of the present disclosure includes receiving, from an SP, a Subscription Request message comprising an identity of a subscriber authentication module embedded in the UE, an identity of a database in which the subscriber authentication module is registered, and an identity of a first mobile communication network to which the UE subscribes, obtaining a profile of a second mobile communication network to which the UE does not subscribe, recording a profile of the second mobile communication network in an entry corresponding to the identity of the subscriber authentication module, downloading the profile of the second mobile communication network in the UE, and sending a Subscription Confirmation message indicating that the profile is normally downloaded to the SP.

An apparatus for providing a data service through a mobile communication network according to an embodiment of the present disclosure includes an interface unit configured to receive an Attach Request message comprising a device identity of a UE which does not subscribe to the mobile communication network and a processor configured to determine, using the device identity of the UE, whether the UE corresponds to a contract for using the mobile communication network, to configure the UE to perform a limited access to the mobile communication network according to the contract if the UE corresponds to the contract for using the mobile communication network, and to control the interface unit to send, to the UE, an Attach Accept message allowing the limited access.

An apparatus for providing a data service through a mobile communication network according to an embodiment of the present disclosure includes an interface unit configured to receive, from an MME of the mobile communication network, a Create Session Request message comprising a device identity of a UE that does not subscribe to the mobile communication network and a processor configured to obtain PCC rules indicating a policy for the UE by using the device identity, to apply the PCC rules to a session for the UE to allow the UE to perform a limited access to the mobile communication network, and to control the interface unit to send, to the MME, a Create Session Response message indicating that the session for the UE is created.

An apparatus for providing a data service through a mobile communication network according to an embodiment of the present disclosure includes an interface unit configured to communicate with at least one mobile communication networks and an SP and a processor configured to provide an identity of a UE that does not subscribe to the mobile communication network to an EIR of the mobile communication network, to provide, to a PCRF of the mobile communication network, a network entity identity for identifying a network entity supporting sponsored data connectivity of the UE, an address to which the UE is attached through the mobile communication network, and information about a QoS profile guaranteed in the mobile communication network, to receive, from the PCRF, a Threshold Reach Notification message comprising a usage data record of the UE, to collect, from the UE, the usage data record collected by the UE, to verify the usage data record collected by the PCRF based on the usage data record collected by the UE, and to deliver an Expiration Alert message comprising the usage data record collected by the PCRF to the SP.

An apparatus for providing a data service through a mobile communication network according to an embodiment of the present disclosure includes an interface unit configured to receive an Authentication Information Provisioning message comprising information about a subscriber identity of a UE and a group key from a network entity supporting sponsored data connectivity of the UE that does not subscribe to the mobile communication network and to receive an Authentication Information Request message comprising a subscriber identity of the UE from an MME of the mobile communication network and a processor configured to search for a group key corresponding to the subscriber identity, to create a cipher key and an integrity key by using the group key, and to control the interface unit to send an Authentication Information Response message comprising an AV comprising the cipher key and the integrity key and a network entity identity for identifying the network entity to the MME.

A UE for receiving a data service through a mobile communication network according to an embodiment of the present disclosure includes an interface unit configured to send, to an SP through a first mobile communication network to which a UE subscribes, a Status Report message comprising a device identity of the UE, a network identity for identifying at least one mobile communication network searched by the UE, and a geographic location of the UE, and to receive, from the SP, a Sponsored Network Announcement message comprising a network identity of a second mobile communication network supporting sponsored data connectivity for the UE and frequency information of the second mobile communication network, and a processor configured to configure attachment to the second mobile communication network by using the device identity of the UE and to control the interface unit to send a Service Request message to the SP through the second mobile communication network.

An apparatus for supporting data service provisioning through a mobile communication network according to an embodiment of the present disclosure includes an interface unit configured to receive, from an SP, a Token Publishing message comprising a device identity of a UE, an identity of at least one mobile communication networks searched by the UE, and a geographic location of the UE, and a processor configured to select a first mobile communication network to which attachment of the UE is to be allowed from among the at least one mobile communication networks, to provide a device identity of the UE, a list of destination IP addresses to which an access of the UE is to be allowed, and a QoS profile to be guaranteed in the UE to the first mobile communication network, and to control the interface unit to send an ACK message comprising an identity of the first mobile communication network and frequency information needed for attachment to the first mobile communication network to the SP.

A UE for receiving a data service through a mobile communication network according to an embodiment of the present disclosure includes an interface unit configured to communicate with at least one mobile communication networks and a processor configured to send, to an SP, a Subscription Request message comprising an identity of a subscriber authentication module embedded in the UE, an identity of a database in which the subscriber authentication module is registered, and an identity of a first mobile communication network, to download a profile of a second mobile communication network to which the UE does not subscribe from a network entity supporting sponsored data connectivity for the SP, to send a Log-in Request message comprising an identity of the second mobile communication network to the SP, to activate the profile of the second mobile communication network while activating the profile of the first mobile communication network, and to send a Log-in Response message comprising an identity of the second mobile communication network and frequency information to the SP through the first mobile communication network.

An apparatus for supporting data service provisioning through a mobile communication network according to an embodiment of the present disclosure includes an interface unit configured to communicate with a mobile communication network and an SP, and a processor configured to receive, from the SP, a Subscription Request message comprising an identity of a subscriber authentication module embedded in the UE, an identity of a database in which the subscriber authentication module is registered, and an identity of a first mobile communication network to which the UE subscribes, to obtain a profile of a second mobile communication network to which the UE does not subscribe, to record a profile of the second mobile communication network in an entry corresponding to the identity of the subscriber authentication module, to download the profile of the second mobile communication network in the UE, and to send a Subscription Confirmation message indicating that the profile is normally downloaded to the SP.

BRIEF DESCRIPTION OF DRAWINGS

The above and other aspects, features and advantages of certain exemplary embodiments of the present disclosure will be more apparent from the following description taken in conjunction with the accompanying drawings, in which.

Throughout the drawings, similar reference numerals will be understood to refer to identical or similar elements, features, and structures.

MODE FOR CARRYING OUT THE INVENTION

Figure 1:
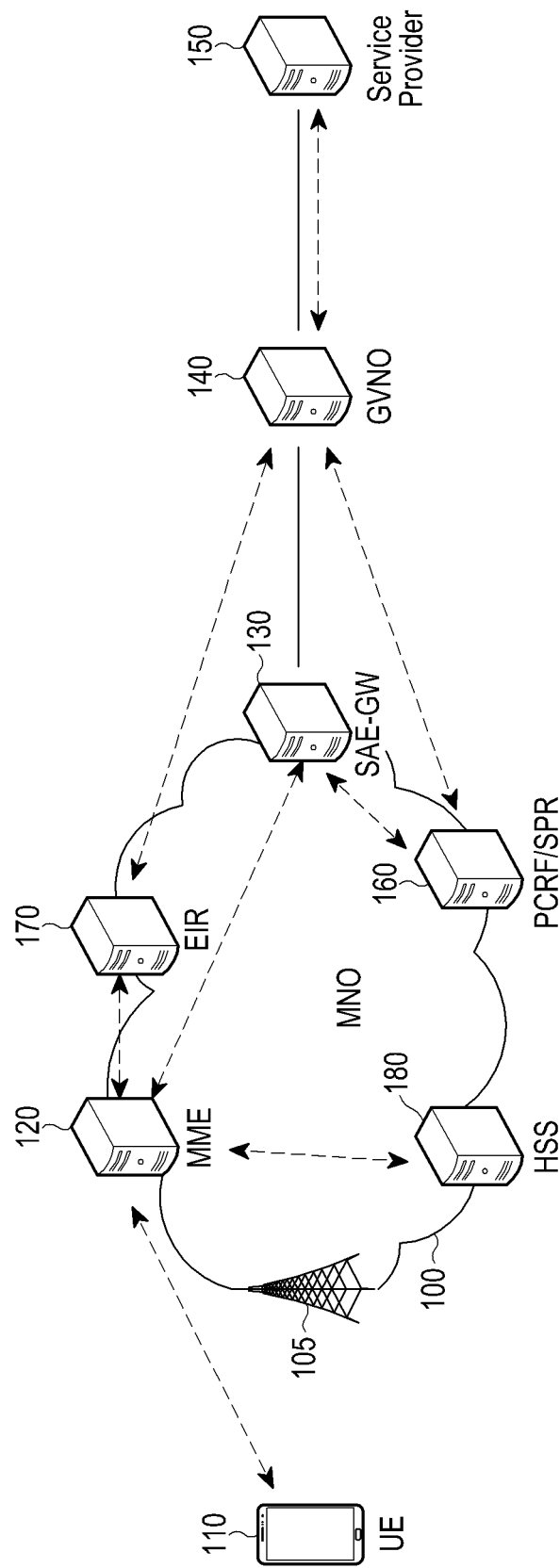
FIG. 1 is a structural diagram of a system for supporting sponsored data connectivity for a terminal (a user terminal (UE)) that does not subscribe to a mobile communication network according to an embodiment of the present disclosure.

Hereinafter, various embodiments of the present disclosure will be disclosed with reference to the accompanying drawings.

When embodiments of the present disclosure are described, technical matters that are well known in a technical field of the present disclosure and are not directly related to the present disclosure will not be described. By omitting an unnecessary description, the subject matter of the present disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the present disclosure and a method for achieving them will be apparent with reference to embodiments described below together with the attached drawings. However, the present disclosure is not limited to the disclosed embodiments, but may be implemented in various manners, and the embodiments are provided to complete the disclosure of the present disclosure and to allow those of ordinary skill in the art to understand the scope of the present disclosure. The present disclosure is defined by the category of the claims. Throughout the specification, an identical reference numeral will indicate an identical element.

It will be understood that each block of the flowchart and/or block diagram illustrations, and combinations of blocks in the flowchart and/or block diagram illustrations, may be implemented by computer program instructions. These computer program instructions may also be stored in a general-purpose computer, a special-purpose computer, or a processor of other programmable data processing devices, such that the instructions implemented the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order. For example, two blocks shown in succession may, in fact, be executed substantially concurrently or the blocks may sometimes be executed in the reverse order, depending on the functionality involved.

The term '~unit' used herein refers to software or a hardware element such as a field-programmable gate array (FPGA), an application specific integrated circuit (ASIC), etc., and '~unit' plays specific roles. However, the meaning of '~unit' is not limited to software or hardware. "Unit" may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~units' may be combined into fewer components and '~units' or further separated into additional components and '~units'. In addition, components and 'unit(s)' may be implemented to execute one or more CPUs in a device or a secure multimedia card.

While a description will be focused on an orthogonal frequency division multiplexing (OFDM)-based wireless communication system when embodiments of the present disclosure are described in detail, a main subject matter to be claimed in the specification is also applicable to other communication systems and services having a similar technical background without significantly departing from a range disclosed herein, as will be obvious to those of ordinary skill in the art.

FIG. 1 is a structural diagram of a system for supporting sponsored data connectivity for a terminal (or a user terminal (UE)) that does not subscribe to a mobile communication network according to an embodiment of the present disclosure.

Referring to FIG. 1, a UE 110 is configured to be wirelessly connectable to a mobile communication network 100 operated by a mobile network operator (MNO). The mobile communication network 100 may be identified by a public land mobile network (PLMN) ID, and may include an evolved Node B (eNB) 105, a mobility management entity (MME) 120, a system architecture evolution (SAE) gateway (GW) (SAE-GW) 130, a policy and charging rules function (PCRF)/subscriber profile repository (SPR) 160, an equipment identity register (EIR) 170, and a home subscriber server (HSS) 180.

The eNB 105 is a radio access network (RAN) node, and corresponds to a radio network controller (RNC) of a universal terrestrial radio access network (UTRAN) and a base station controller (BSC) of a GSM EDGE radio access network (GERAN) system. The eNB 105 is connected to the UE 110 through a radio channel, and manages wireless communication of the UE 110 similarly with the RNC/BSC. The eNB 105 covers several cells at the same time. The eNB 105 collects situation information of UEs that receive a service through a common channel and schedules resources.

The MME 120 manages control signaling of a mobile communication network and is connected with multiple eNBs.

The SAE-GW 130 manages functions of a serving gateway for managing mobility in a network and a packet data network (PDN) gateway (or a packet gateway (PGW)) for managing mobility between networks. The SAE-GW 130 generates or removes a bearer for user traffics under control of the MME 120.

The PCRF 160 manages control of a policy related to a quality of service (QoS) of all terminals connecting to a mobile communication network and may include an SPR. The policy is defined by policy and charging control (PCC) rules which are applied to a data bearer by the SAE-GW 130.

The EIR 170 has an interface with the MME 120 and the SAE-GW 130 and is a repository used to authenticate the UE 110 and to identify the UE 110.

The HSS 180 is a subscriber database that accepts information (profile) of subscribers subscribing to a mobile communication network, and manages a user ID, a service authority, an authentication state, a filter criteria, etc., and provides or is provided with and stores subscriber information through an interface with another system.

The SAE-GW 130 in the mobile communication network 100 is directly connected with a service provider (SP) 150 or is connected through a network entity for supporting sponsored data connectivity of non-subscribing terminals. The network entity is referred to as a global virtual network operator (GVNO)) 140 herein. The GVNO 140 relays the mobile communication network 100 and the SP 150 to support sponsored data connectivity of the non-subscribing UE 110 that does not subscribe to the mobile communication network 100 of a mobile network operator. The GVNO 140 provides a service of the SP 150 to the UE 110 that does not subscribe to the mobile communication network 100 through the mobile communication network 100 and pays a communication fee generated due to providing of the service or charges a sponsor for the communication fee.

In an embodiment, when the SP 150 desires to execute a global service for users distributed over a plurality of countries, it is a technically or economically big burden to make a multi-to-one contract for communication fee payment by proxy with a plurality of mobile network operators operating in a plurality of countries and to provide services. The GVNO 140 makes a pre-contract with the mobile network operators to support the SP 150 such that the SP 150 uses mobile communication networks by the plurality mobile network operators.

In another embodiment, the SP 150 may be directly connected to a mobile communication network without passing through a separate GVNO to allow the terminal that does not subscribe to the mobile communication network 100 to use a service of the SP 150 through the mobile communication network 100. In this case, the SP 150 may be defined as including a function of the GVNO 140.

Hereinbelow, for convenience, the GVNO 140 will be described separately from the SP 150, but obviously, the following description is applicable to a case where the SP 150 includes the function of the GVNO 140.

Figure 2:
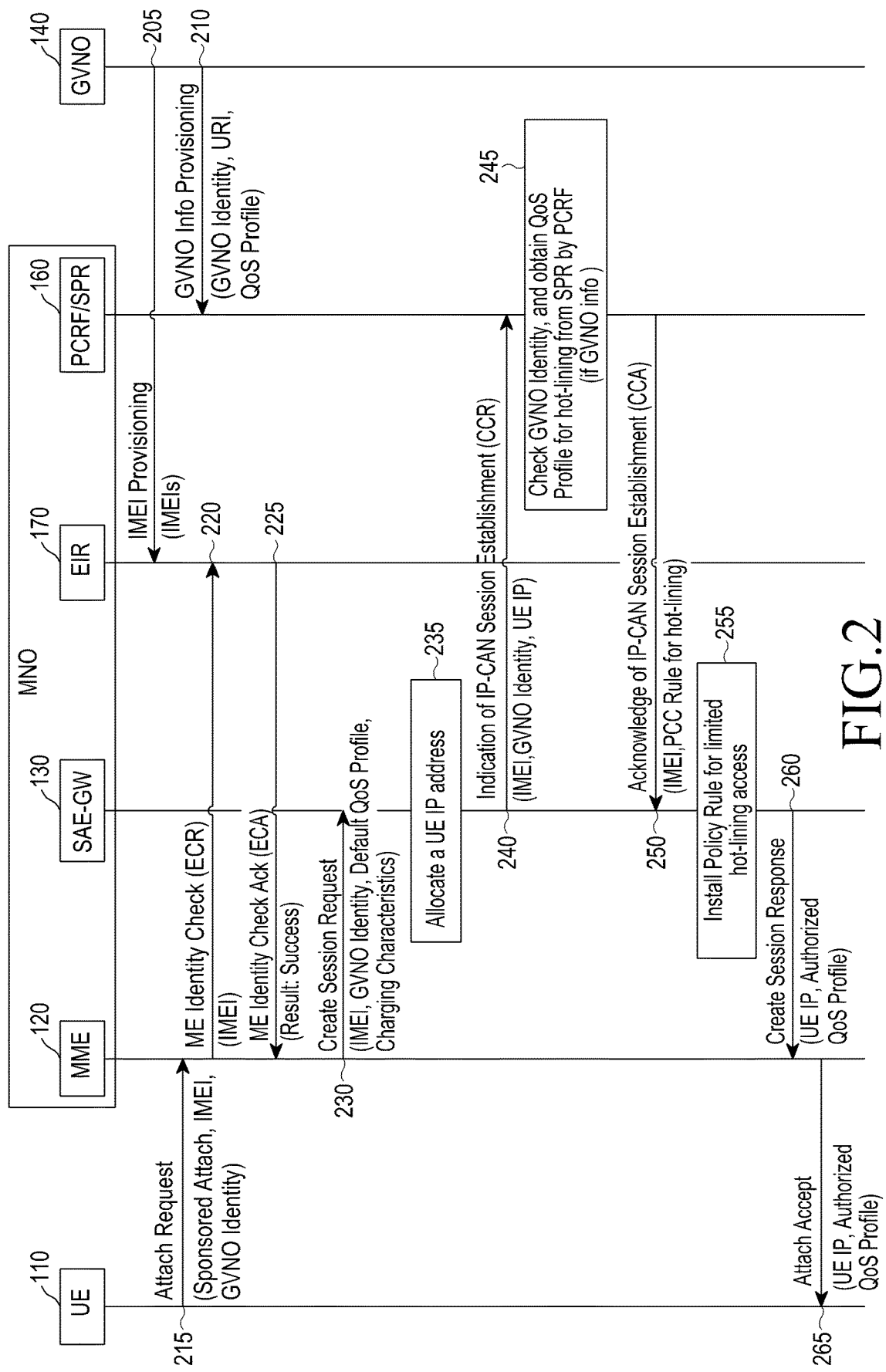
FIG. 2 is a message flowchart of a procedure in which a UE is granted a limited hot-lining access from a mobile communication network to which the UE does not subscribe according to an embodiment of the present disclosure.

FIG. 2 is a message flowchart of a procedure in which a UE is granted a limited hot-lining access from a mobile communication network to which the terminal does not subscribe according to an embodiment of the present disclosure.

The UE 110 in the illustrated example is a non-subscribing terminal that does not include a subscriber authentication module such as a universal integrated circuit card (UICC) and may be a dedicated device manufactured and/or sold by the SP 150. The SP 150 makes a mobile communication network attach contract with the GVNO 140 in advance to allow the UE 110 to access a service of the SP 150 through a mobile communication network. Before the UE 110 attempts attachment to the mobile communication network, the SP 150 delivers an international mobile station equipment identity (IMEI), which is a unique device identity of the UE 110, a uniform resource identifier (URI) indicating an address to which the UE 110 needs to attach for authentication with the SP 150, and a QoS profile that the mobile communication network has to guarantee in authentication between the UE 110 and the SP 150 to the GVNO 140, according to the contract.

Referring to FIG. 2, in operation 205, the GVNO 140 provisions the IMEI of the UE 110 to which a mobile communication service contracted with the SP 150 is to be provided to the EIR 170 of the mobile communication network 100. While operations of one mobile communication network will be described below, the GVNO 140 may also provide information related to the UE 110 to a plurality of mobile communication networks. For example, in operation 205, the GVNO 140 may transmit an IMEI Provisioning message including the IMEI of the UE 110 to EIRs of the plurality of mobile communication networks. Likewise, the GVNO 140 may deliver IMEIs of a plurality of contracted UEs to an EIR of each mobile communication network. The plurality of IMEIs may be delivered to each BR through one message or separate messages.

In operation 210, the GVNO 140 provides a GVNO Information Provisioning message including information such as a GVNO identity for identifying the GVNO 140, a URI to which the UE 110 connects in an authentication procedure between the UE 110 and the SP 150, and a QoS profile the mobile communication network 100 has to guarantee in the authentication procedure to a policy and charging rules function (PCRF) (or SPR) 160 of the mobile communication network 100.

In operation 215, the UE 110 sends an Attach Request message to the MME 120 to attempt attachment to the mobile communication network 100. In this case, the UE 110 has not subscribed to the mobile communication network 100, and thus has no subscriber ID, IMSI. A typical mobile communication network does not accept an attempt for attachment by a non-subscribing UE, and thus to allow attachment by the non-subscribing UE 110 that requires sponsored data attachment, a special attachment delimiter is needed. To this end, a code indicating a new attachment type called 'Sponsored Attach' is added to an Attach Request message to be sent by the UE 110. The MME 120 detects a sponsored attach type of the Attach Request message and checks the GVNO 140 identified by a GVNO identity delivered through the Attach Request message to determine whether to provide a service to the UE 110 through the mobile communication network 100. The UE 110 does not have the UICC and thus delivers the unique device identity, IMEI, to the MME 120 through the Attach Request message.

In operation 220, the MME 120 sends a mobile equipment (ME) Identity Check message including the IMEI of the UE 110 to the EIR 170 to determine whether the attach-requesting UE 110 corresponds to a contract for allowing a limited access. In operation 225, the EIR 170 determines that the IMEI of the attach-requesting UE 110 is stored in an internal memory, and then returns an ME acknowledgement (ACK) (ECA) message to the MME 120.

The MME 120 having completed identification of the UE 110 through the procedure may configure the UE 110 to perform a limited access to the mobile communication network 100. The limited access means a state where the UE 110 is allowed to perform communication only for authentication with the SP 150 in the mobile communication network 100 of the MME 120.

In operation 230, the MME 120 sends a Create Session Request message to the gateway 130 to initiate a procedure for configuring an evolved packet system (EPS) session and a default bearer. Since the UE 110 does not have the UICC, the Create Session Request message includes an MEI instead of the subscriber II) of the UE 110, IMSI, and may further include at least one of a GVNO identity, a default QoS profile, and charging characteristics.

In operation 235, the gateway 130 allocates an Internet Protocol (IP) address for the UE 110. To obtain information for policy control such as allocation of resources and a QoS needed for creating the EPS session for the UE 110, the gateway 130 delivers information needed for decision of the policy, such as at least one of the IMEI, which is the UE ID, the GVNO identity, and the IP address, received from the MME 120, to the PCRF/SPR 160 through a credit control request (CC-Request) (CCR) message instructing establishment of an IP-connectivity access network (CAN) session in operation 240.

In operation 245, the PCRF/SPR 160 decides a PCC policy for the EPS session to be created, based on the GVNO identity delivered from the gateway 130. Although the PCRF and the SPR are illustrated together in the illustrated example, the PCC policy may also be decided through message exchange between the PCRF and the SPR if the PCRF and the SPR exist as separate entities in another embodiment. The PCC policy decided as described above includes a limited access policy that allows only corresponding traffics such that the UE 110 performs authentication with the SP 150. For example, the PCC policy may allow only traffics having a destination IP address destined to a server of the SP 150 and block or redirect other traffics to the server of the SP 150.

In operation 250, the PCRF/SPR 160 delivers the decided PCC policy to the gateway 130 through a CC-answer (CCA) message. The CCA message may include IMEI and PCC rules, and the PCC rules may include at least one of a service data flow (SDF) filter, a QoS class identifier (QCI), an allocation and retention priority (ARP), an access point name-aggregate maximum bit rate (APN-AMBR), and a charging rule according to the PCC policy.

In operation 255, the gateway 130 installs the PCC rules received from the PCRF/SPR 160. This means that the PCC rules start to be applied to user traffics related to the UE 110 introduced to the gateway 130, that is, a session and a bearer created for the UE 110.

In operation 260, the gateway 130 sends a Create Session Response message including the IP address of the UE 110 and the authorized QoS profile to the MME 120 to notify the MME 120 that configuration of the EPS session and the default bearer has been completed. The authorized QoS profile indicates a QoS applied to the EPS session and the default bearer.

In operation 265, the MME 120 sends the IP address and a QoS parameter (i.e., the authorized QoS profile, etc.) of the UE 110 allocated by the gateway 130 to the UE 110 through an Attach Accept message in response to the Attach Request message sent by the UE 110 in operation 215.

Figure 3:
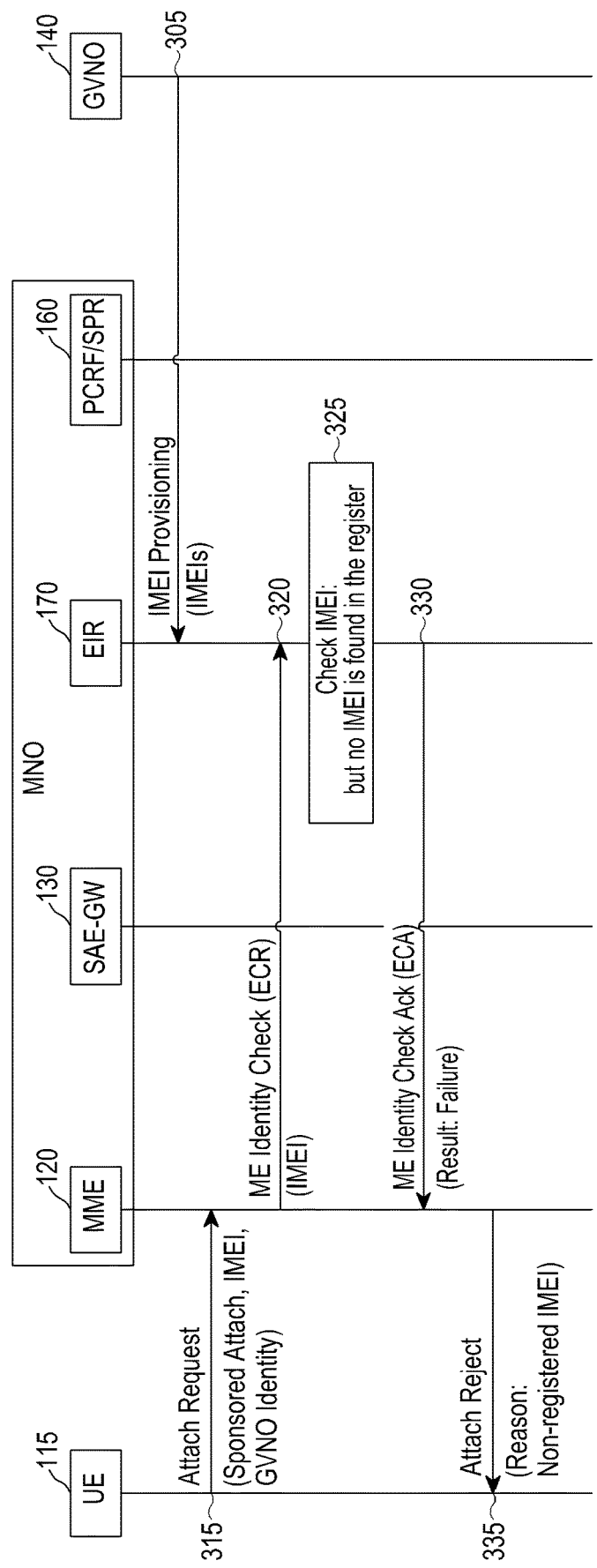
FIG. 3 is a message flowchart of a procedure in which a UE attempts attachment to a mobile communication network to which an access of the UE is not granted according to an embodiment of the present disclosure.

FIG. 3 is a message flowchart of a procedure in which a UE attempts to access a mobile communication network to which an access of the terminal is not granted according to an embodiment of the present disclosure. In the illustrated example, a UE 115 is a non-subscribing UE having no UICC, and the mobile communication network 100 does not have limited access permission for the UE 115.

Referring to FIG. 3, in operation 305, the GVNO 140 provisions ID information of at least one UE to which a mobile communication service contracted with the SP 150 is to be provided, i.e., the IMEI, to the EIR 170 of the mobile communication network 100. In operation 315, the UE 115 sends an Attach Request message including an attach type code of sponsored attachment, the IMEI, and the GVNO identity, to the MME 120 to attempt attachment to the mobile communication network 100. In operation 320, the MME 120 sends an ME Identity Check message including the IMEI of the UE 115 to the EIR 170 to determine whether the UE 115 is granted limited access permission.

In operation 325, the EIR 170 determines that the IMEI of the attach-requesting UE 115 is not stored in an internal memory. If the IMEI of the UE 115 is not registered in the EIR 170, it means that the GVNO 140 contracted with the mobile communication network 100 to which the UE 115 attempts to be attached does not support the UE 115 or a GVNO supporting the UE 115 does not make a contract with the mobile communication network 100 to which the UE 115 attempts to be attached. The EIR 170 determining that the IMEI of the UE 115 is not registered sends an ME identification ACK message including a result code of a failure to the MME 120 in operation 330. In operation 335, the MME 120 sends an Attach Reject message including a result code corresponding to a non-registered IMEI to the UE 115 to notify that attachment to the mobile communication network 100 is not allowed.

Figure 4:
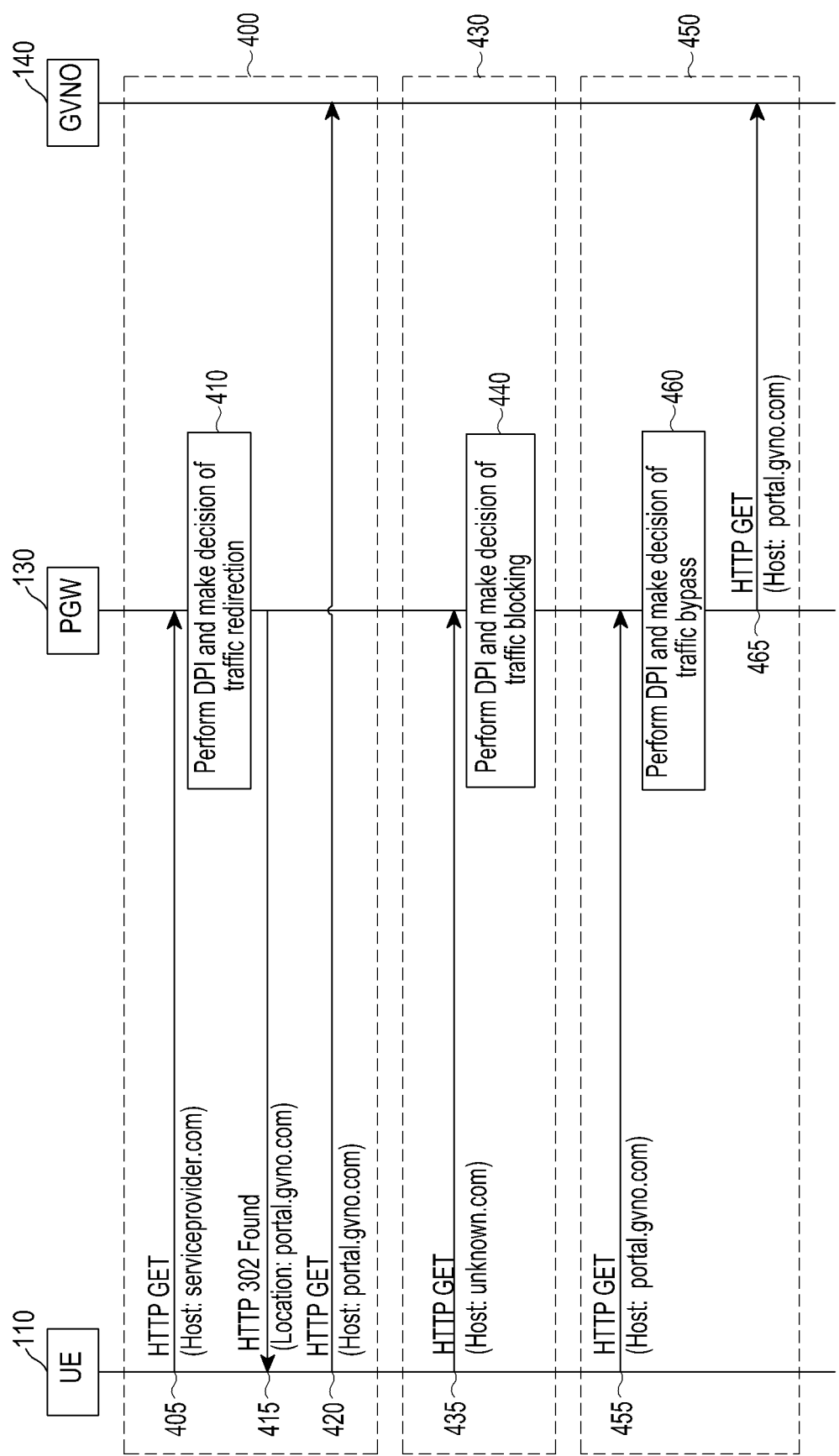
FIG. 4 is a message flowchart of a traffic processing procedure in accordance with policy and charging control (PCC) rules installed in a gateway according to an embodiment of the present disclosure.

FIG. 4 is a message flowchart of a traffic processing procedure in accordance with PCC rules installed in a gateway according to an embodiment of the present disclosure. In the illustrated example, the gateway 130 installs the PCC rules in operations 205 through 255 of FIG. 2. The PCC rules include "portal.gvno.com" or its corresponding IP address as an URI provided by the GVNO 140.

Based on the PCC rules installed in the gateway 130, the gateway 130 may perform traffic processing for three situations 400, 430, and 450 as below.

The first situation 400 indicates a case where the gateway 130 redirects traffics. In operation 405, the UE 110 sends a hypertext transfer protocol (HTTP) GET message for attempting to be attached to a server of an SP to the gateway 130 before performing authentication with the SP 150 in a limited access permission state. The HTTP GET message may include "serviceprovider.com" as a URL of the server. In operation 410, the gateway 130 performs deep packet inspection (DPI) to check the URL included in the HTTP GET message based on PCC rules related to the UE 110. Since the URL of the server is not included in the PCC rules, the gateway 130 determines that the UE 110 has not yet been authenticated by an SP corresponding to the URL and does not allow attachment to the server. Moreover, in operation 415, the gateway 130 generates an HTTP 302 Found message in which "portal.gvno.com" is designated as a location and sends the generated HTTP 302 Found message to the UE 110 to redirect the UE 110 to a URI contracted with the GVNO 140, "portal.gvno.com". In operation 420, the UE 110 sends an HTTP GET message including "portal.gvno.com", and the HTTP GET message may be accepted by the gateway 130.

The second situation 430 indicates a case where the SAE-GW 130 blocks traffics. In operation 435, the UE 110 attempts attachment to a URI (e.g., unknown.com) that is not allowed in the PCC rules installed in the gateway 130 through the HTTP GET message. In operation 440, the gateway 130 determines that the URL is not included in the PCC rules of the UE 110 through the DPI and blocks traffic delivery of the HTTP GET message.

The third situation 450 indicates a case where the gateway 130 normally passes the traffics therethrough. In operation 450, the UE 110 attempts attachment to a URI, portal.gvno.com, allowed in the PCC rules installed in the gateway 130 through the HTTP GET message. The gateway 130 determines that the URL is included in the PCC rules of the UE 110 through the DPI in operation 460 and passes the traffics of the HTTP GET message therethrough in operation 465, such that the HTTP GET message arrives at the GVNO 140.

Figure 5A:
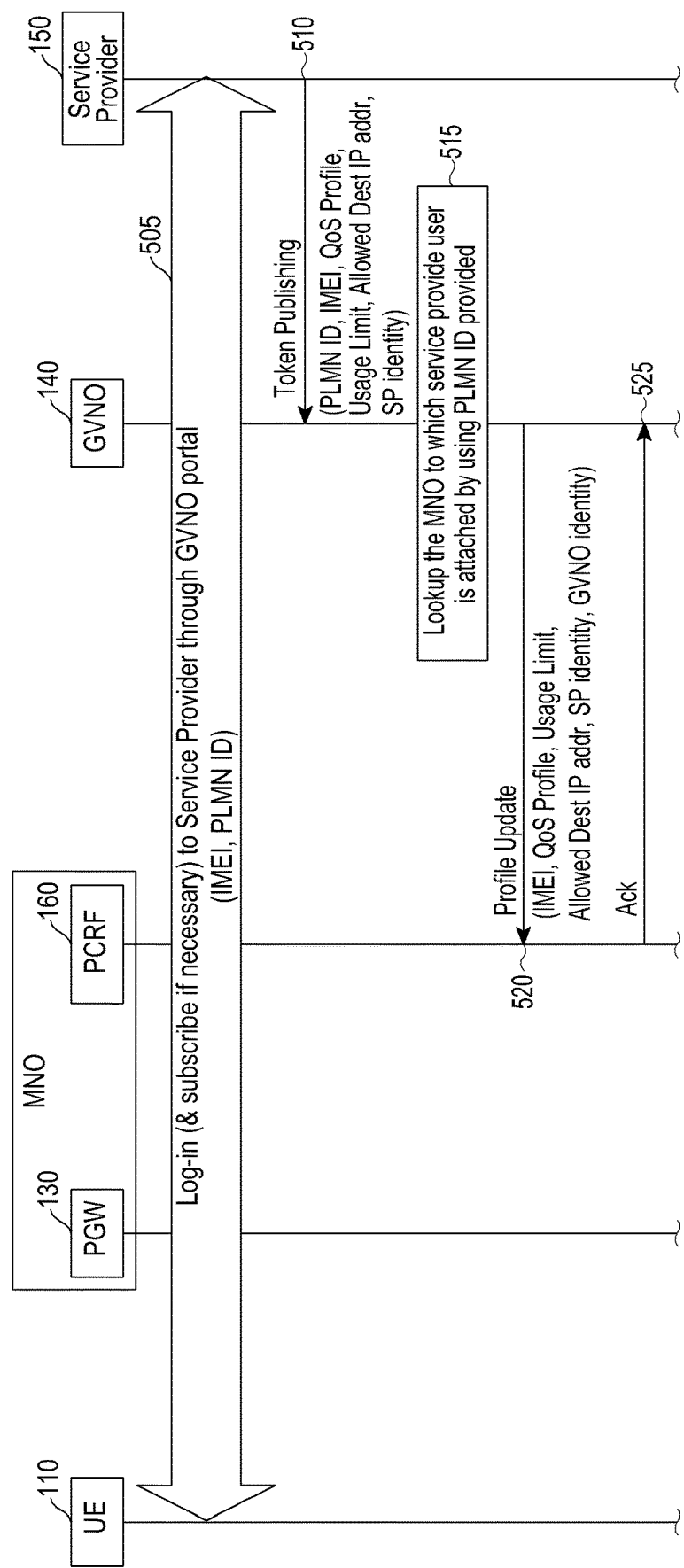
FIG. 5 (including FIGS. 5A and 5B) is a message flowchart of a procedure in which an evolved packet system (EPS) session generated in a mobile communication network is updated by a token issued by a service provider (SP) according to an embodiment of the present disclosure.
Figure 5B:
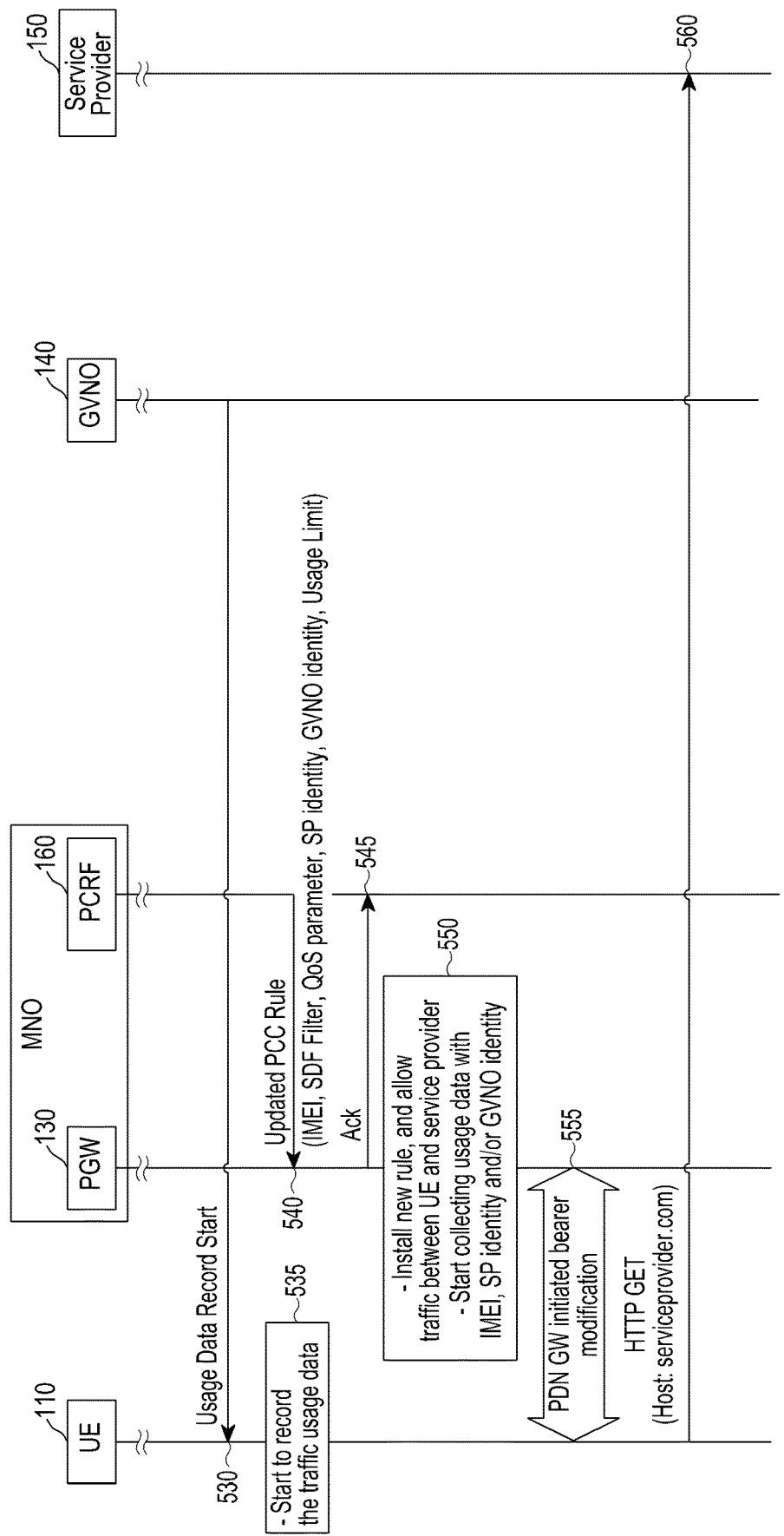

FIG. 5 (including FIGS. 5A and 5B) is a message flowchart of a procedure in which an EPS session generated in a mobile communication network is updated by a token issued by an SP according to an embodiment of the present disclosure. Herein, the UE 110 does not have a UICC and has been authenticated by the SP 150.

Referring to FIG. 5, in operation 505, the UE 110 performs message exchange for authentication with the SP 150 through the GVNO 140. For authentication between the two entities 110 and 150, various schemes such as a user log-in using an ID/password of a website or an OpenAuth (OAuth) 2.0 protocol may be used. Through the authentication procedure, the UE 110 delivers, to the SP 150, the IMEI, which is a device identity of the UE 110, and a PLMN ID, which is an identity of the mobile communication network 100 to which the UE 110 is in a limited access.

After determining the validity of the UE 110 in operation 505, the SP 150 sends a Token Publishing message to the GVNO 140 to request provisioning of a data service from a device corresponding to the IMEI through the mobile communication network 100 corresponding to the PLMN ID delivered from the UE 110 in operation 510. The Token Publishing message may include at least one of the PLMN ID of the mobile communication network 100, the IMEI of the UE 110, the QoS profile which has to be satisfied when a service is provided to the UE 110, a usage limit indicating a maximum data allowance or allowable period to be allowed to the UE 110, and a destination IP address to which attachment is to be allowed to the UE 110. The usage limit means a maximum data usage (or usage amount) available to the UE 110 for the service of the SP 150.

In operation 515, the GVNO 140 identifies the PCRF 160 of the mobile communication network 100 to which the UE 110 is currently attached to, based on the PLMN ID provided by the SP 150. In operation 520, the GVNO 140 sends a Profile Update message for requesting update of a policy of the UE 110 in the limited access state to the PCRF 160. The Profile Update message may include information about the policy, together with the IMEI of the UE 110 to which the policy is to be applied. The information about the policy may include at least one of the QoS profile the mobile communication network 100 has to provide when the service is provided to the UE 110, a usage limit indicating a maximum data allowance or allowable period to be allowed to the UE 110, an identity of the SP 150 and an identity of the GVNO 140 to be used as charging criteria, and a destination IP address to which attachment is to be allowed to the UE 110. In operation 525, the PCRF 160 updates the policy and delivers an ACK message to the GVNO 140.

The GVNO 140 delivers a Usage Data Record Start message instructing initiation of recording of a data usage to the UE 110 in operation 530, and the UE 110 starts recording the amount of data traffics transmitted and received by the UE 110 in response to the reception of the Usage Data Record Start message in operation 535.

In operation 540, the PCRF 160 delivers information about the updated policy to the SAE-GW 130 through an updated PCC rule message. The updated PCC rule message may include at least one of the IMEI, which is an identity of the UE 110 to which the policy is to be applied, an SDF filter that limits a destination to which the UE 110 may attach (e.g., to a server of the SP), a QoS profile the mobile communication network 100 has to provide when a service is provided to the UE 110, a usage limit indicating a maximum data allowance or allowable period to be allowed to the UE 110, and an identity of the SP 150 and an identify of the GVNO 140 to be used as charging criteria. In operation 545, the gateway 130 sends an ACK message to the PCRF 160 to notify the PCRF 160 of normal reception of the PCC rule message.

In operation 550, the gateway 130 installs the updated policy received from the PCRF 160 and allows traffics between the UE 110 and the SP 150 according to the updated policy. Thus, the UE 110 becomes connectable with the server of the SP 150 and is guaranteed with the QoS and the data allowance designated in the policy. The gateway 130 starts recording the data usage of the UE 110. The unit of recording may be a device (IMEI), an SP (SP identity), a GVNO (GVNO identity), or a combination of at least two of them, for convenience of charging and calculation.

In operation 555, the gateway 130 initiates bearer modification of the UE 110, through which the QoS policy applied to a path between the UE 110 and the gateway 130 is updated.

In operation 560, the UE 110 delivers the HTTP GET message to the SP 150 through the gateway 130, thus being provided with the service of the SP 150 through the mobile communication network 100.

Figure 6A:
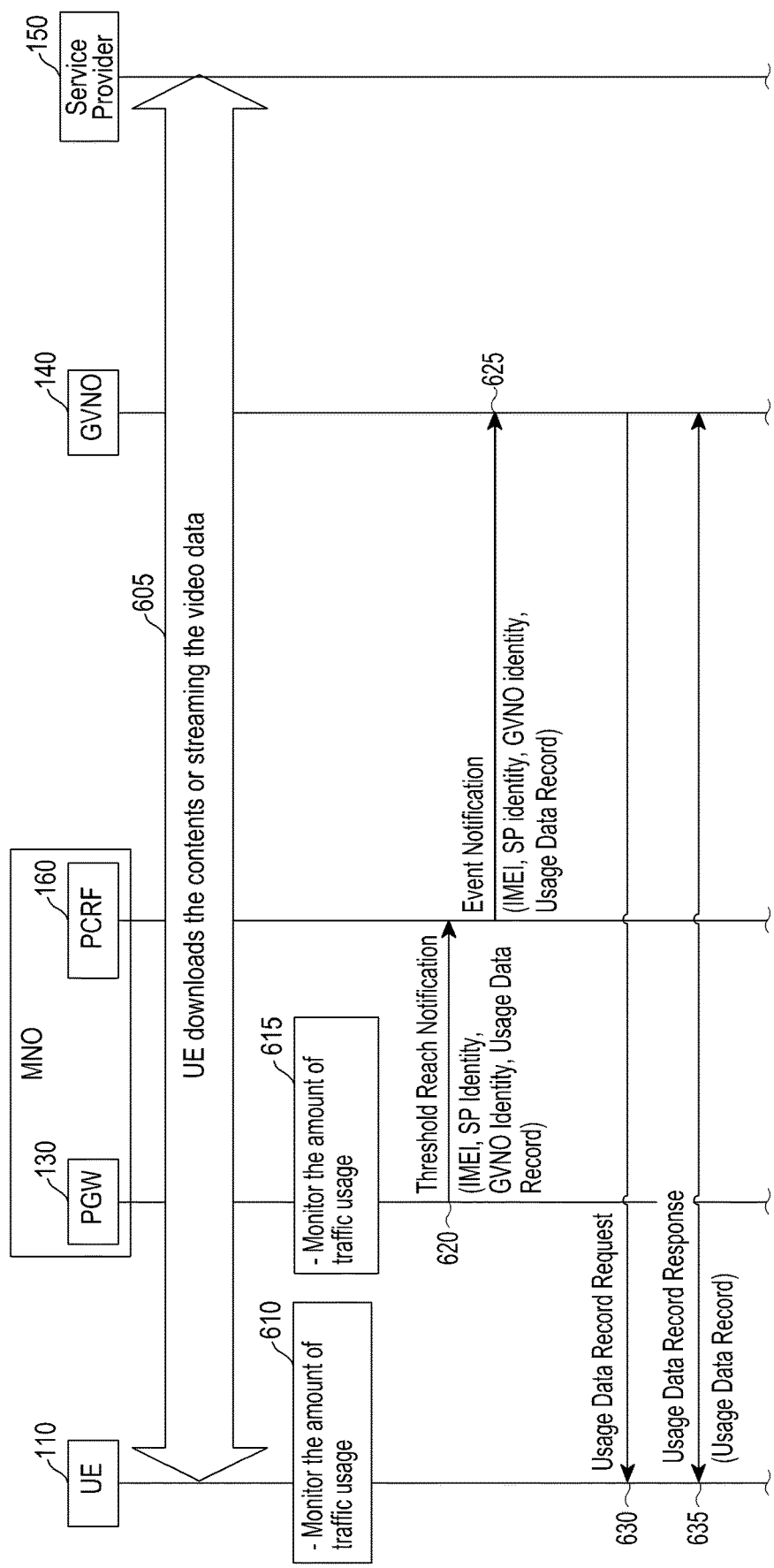
FIG. 6 (including FIGS. 6A and 6B) is a message flowchart of a procedure in which an EPS session generated in a mobile communication network is updated by a token re-issued by an SP according to an embodiment of the present disclosure.
Figure 6B:
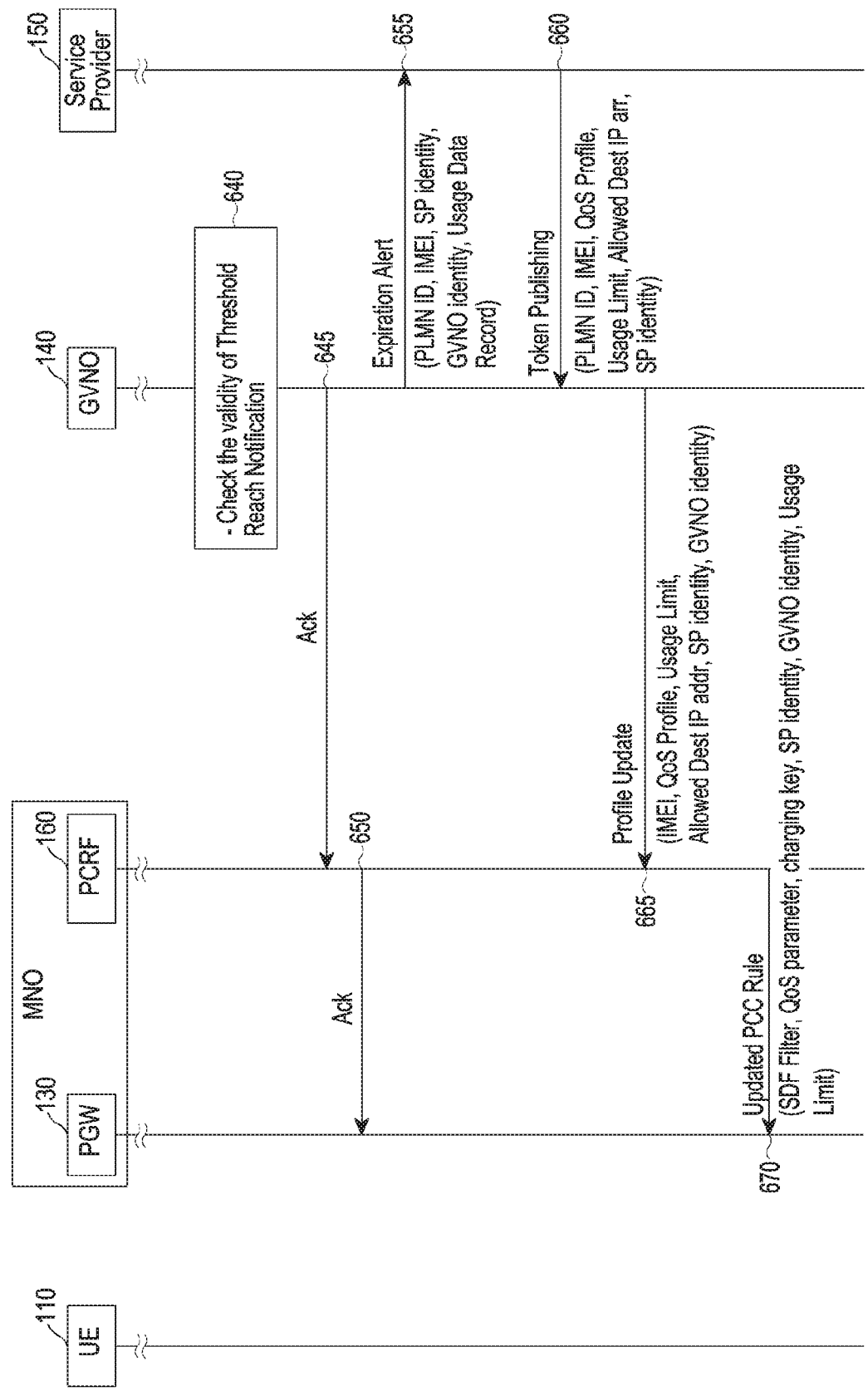

FIG. 6 (including FIGS. 6A and 6B) is a message flowchart of a procedure in which an EPS session generated in a mobile communication network is updated by a token re-issued by an SP according to an embodiment of the present disclosure. Herein, the UE 110 does not have a UICC and has been authenticated by the SP 150.

Referring to FIG. 6, in operation 605, the UE 110 uses a service (e.g., content downloading or video streaming) from the SP 150 through the mobile communication network 100. In operations 610 and 615, the UE 110 and the gateway 130 of the mobile communication network 100 record a service-based data usage, respectively. The UE 110 may be configured to deliver a usage data record to the GVNO 140 periodically or at the request of the GVNO 140. The gateway 130 may be configured to notify the PCRF 160 of an excess of the usage data record over a maximum data allowance determined by the policy, if the usage data record exceeds the maximum data allowance.

In operation 620, the gateway 130 detects that the data usage of the UE 110 exceeds the maximum data allowance and sends a Threshold Reach Notification message indicating so to the PCRF 160. The Threshold Reach Notification message may include the IMEI, which is the identity of the UE 110, the identity of the SP 150, the identity of the GVNO 140, and the usage data record. In operation 625, the PCRF 160 delivers the information included in the Threshold Reach Notification message to the GVNO 140 through an Event Notification message.

The GVNO 140 may request a usage data record of the UE 110 to verify the notification from the gateway 130 if determining that it is necessary to do so. In operations 630 and 635, the GVNO 140 sends, to the UE 110, a request for reporting a usage data record the UE 110 has collected, and receives the usage data record of the UE 110 in response to the request, respectively. In operation 640, the GVNO 140 cross-checks the usage data record collected by the gateway 130 of the mobile communication network 100 and the usage data record collected by the UE 110 to verify the usage data record notified by the gateway 130. If determining that a difference between the two usage data records is significantly large, the GVNO 140 may request the gateway 130 to re-check the usage data record. Additionally, the GVNO 140 may use a check result of the usage data record as a criterion for determining whether to maintain the contract with the mobile communication network 100. If determining that the usage data records of the UE 110 and the gateway 130 match each other or a difference therebetween is relatively ignorable, the GVNO 140 delivers an ACK message to the gateway 130 through the PCRF 160 in operations 645 and 650.

The GVNO 140 determines whether the verified usage data record of the UE 110 reaches or is very close to a maximum data usage specified in a token issued by the SP 150 within a predetermined range. If the usage data record of the UE 110 reaches (or is close to) the maximum data usage, the GVNO 140 delivers, to the SP 150, an Expiration Alert message indicating that the UE 110 entirely (or almost) consumes the data usage specified in the token issued by the SP 150 in operation 655 The Expiration Alert message may include the PLMN ID, the IMEI, the SP identity, the GVNO identity, and the usage data record.

In response to the Expiration Alert message, the SP 150 determines whether an additional data service permission is needed for the UE 110. If determining to allow additional data use to the UE 110, the SP 150 re-issues a token for allowing the additional data use, and in operation 660, the SP 150 sends a Token Publishing message for requesting continuous provisioning of a data service to the UE 110 through the mobile communication network 100 to the GVNO 140. The Token Publishing message may include at least one of the PLAIN ID, the IMEI, the QoS profile, the usage limit based on the re-issued token, the allowed destination IP address, and the SP identity.

Information included in the Token Publishing message is delivered to the PCRF 160 through a Profile Update message to the PCRF 160 in operation 665, and delivers a usage limit based on the re-issued token to the gateway 130 through an Updated PCC Rule message in operation 670. The gateway 130 installs an additional maximum data allowance according to the updated. PCC rules, and prepares for allowing the UE 110 to be continuously attached to the server of the SP 150.

Figure 7:
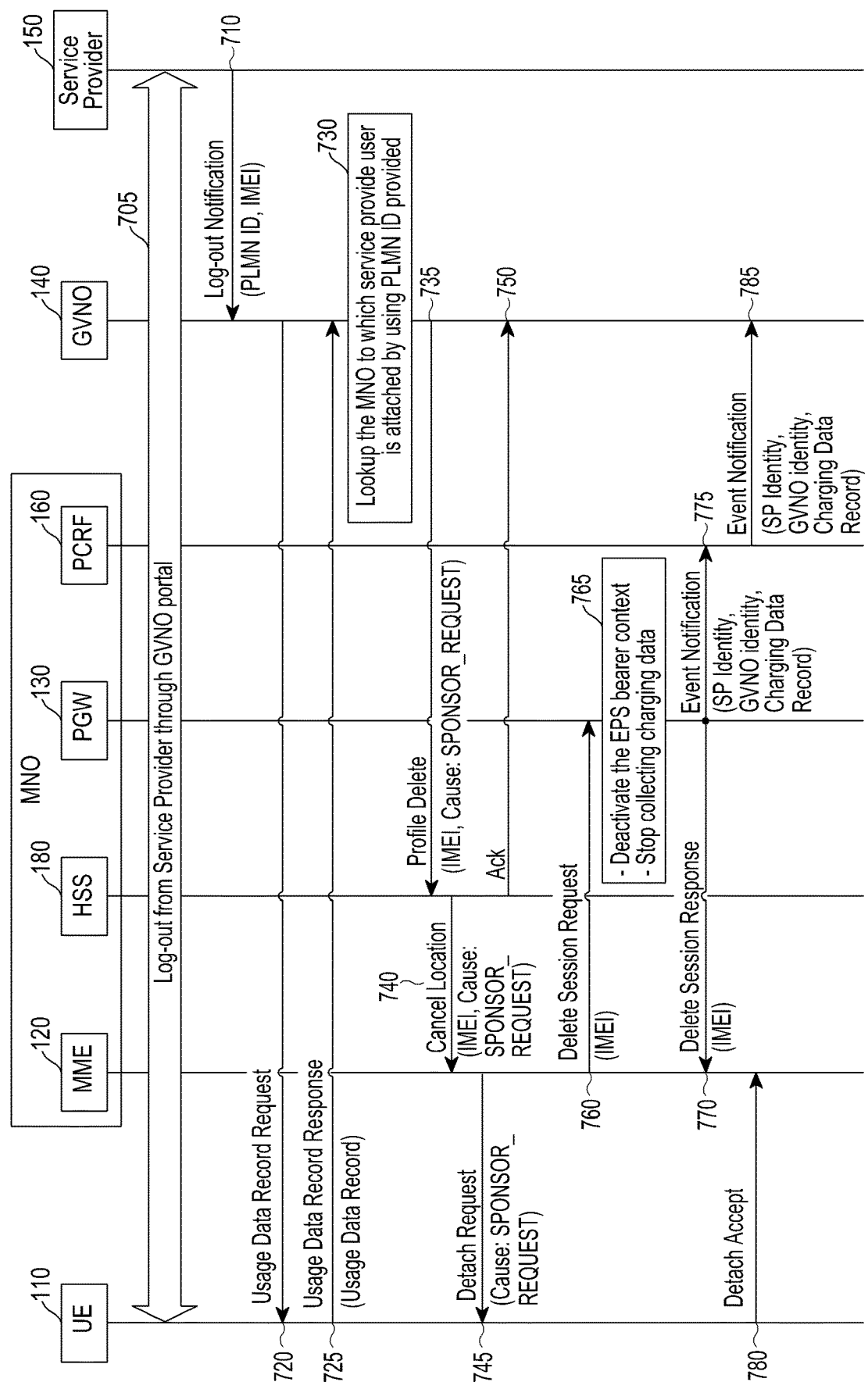
FIG. 7 is a message flowchart of a procedure in which an EPS session generated in a mobile communication network is released by a notification of an SP according to an embodiment of the present disclosure.

FIG. 7 is a message flowchart of a procedure in which an EPS session generated in a mobile communication network is released by a notification of an SP according to an embodiment of the present disclosure. In the illustrated example, the UE 110 does not have a UICC and is identified by authentication between the UE 110 and the SP 150, instead of an EPS authentication and key agreement (EPS-AKA) procedure of the mobile communication network 100. If one UE 110 is used by several users, the UE 110 releases all EPS sessions established with the mobile communication network 100 when one user releases attachment due to the release of authentication with the SP 150 or for other reasons. Otherwise, another user using the UE 110 may use the EPS session established for a previous user.

In operation 705, the UE 110 exchanges messages of an application layer for releasing authentication with the SP 150 through the GVNO 140. The release of authentication may be similar with user log-out of a website, or may use various schemes such as an OAuth 2.0 protocol.

In operation 710, the SP 150 sends a Log-out Notification message including the PLMN ID and the IMEI to the GVNO 140 to request the release of the EPS session of the UE 110, identified by the IMEI, which is attached to the mobile communication network 100 identified by the PLMN ID.

The GVNO 140 requests the UE 110 to return a usage data record in response to reception of the Log-out Notification message in operation 720, and the UE 110 returns the usage data record to the GVNO 140 in operation 725. The usage data record collected from the UE 110 is to be used for the GVNO 140 to verify a usage data record received from the mobile communication network 100 for calculation.

In operation 730, the GVNO 140 identifies the HSS 180 of the mobile communication network 100 to which the UE 110 is currently attached, based on the PLMN ID provided by the SP 150.

In operation 735, the GVNO 140 delivers, to the HSS 180, a Profile Delete message for requesting detachment of the LIE 110 identified by the IMEI from the mobile communication network 100. The Profile Delete message may include the IMEI of the UE 110 to be detached and a code SPONSOR_REQUEST indicating a reason for detachment. The code SPONSOR_REQUEST means that the detachment of the UE 110 is requested at the request of the SP 150, which is a sponsor.

In operation 740, the HSS 180 initiates a procedure for detaching the UE 110 from the mobile communication network 100 by sending a Cancel Location message to the MME 120. The Cancel Location message may include the IMEI, which is a device identity of the UE 110, and a code indicating a reason for detachment. In operation 750, the HSS 180 delivers, to the GVNO 140, an ACK message in response to the Profile Delete message.

In operation 745, the MME 120 sends a Detach Request message to the UE 110 to allow the UE 110 to be detached from the mobile communication network 100. The Detach Request message may include a code indicating a reason for detachment. In operation 760, the MME 120 delivers a Delete Session Request message including the IMEI to the gateway 130 to initiate release of the EPS session including a bearer for the UE 110 identified by the IMEI.

In operation 765, the gateway 130 deletes information of the EPS session related to the UE 110 identified by the IMEI and stops collecting a usage data record related to the UE 110. The gateway 130 delivers a Delete Session Response message to the MME 120 in response to the Delete Session Request message in operation 770, and delivers the usage data record collected for the UE 110 as a charging data record for charging and calculation to the PCRF 160 through an Event Notification message in operation 775.

In operation 780, the UE 110 delivers a Detach Accept message to the MME 120 in response to the Detach Request message in operation 780.

In operation 785, the PCRF 160 of the mobile communication network 100 delivers the charging data record delivered from the gateway 130 to the GVNO 140 to allow the GVNO 140 to perform charging and calculation.

Figure 8:
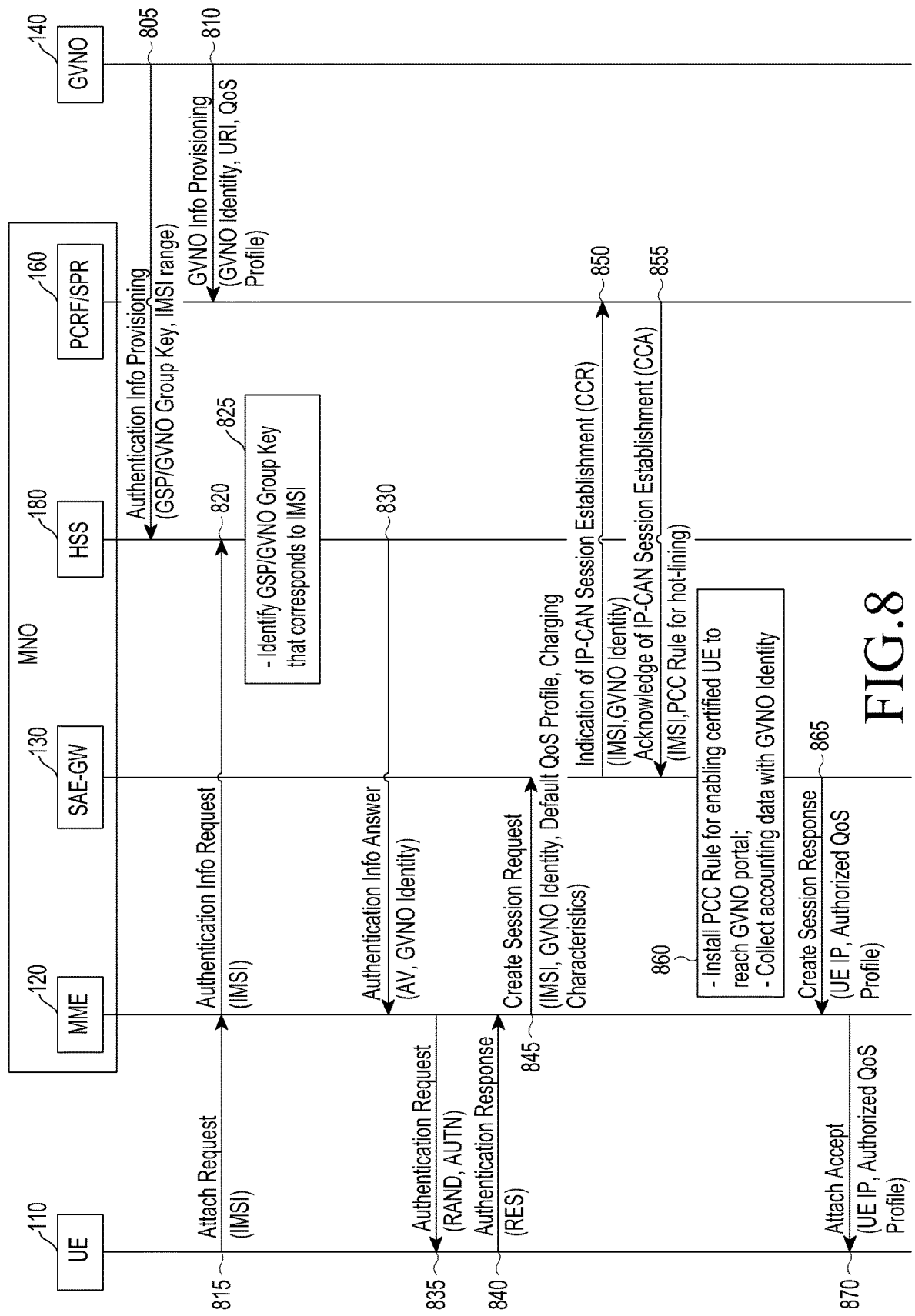
FIG. 8 is a message flowchart of a procedure in which a UE is granted a limited hot-lining access from a mobile communication network to which the UE does not subscribe according to another embodiment of the present disclosure.

FIG. 8 is a message flowchart of a procedure in which a UE is granted a limited hot-lining access from a mobile communication network to which the terminal does not subscribe according to another embodiment of the present disclosure.

In the illustrated example, the UE 110 has a subscriber interface module such as the UICC, but is not subscribed to the mobile communication network 100 to which the UE 110 desires to be attached. The UICC has a unique identity of the UE 110, the IMSI, and a separate security key K. If the UE 110 subscribes to the mobile communication network 100, the mobile communication network 100 stores an IMSI and a security key K, which are the same as those stored in the UICC of the UE 110, in an authentication center (AuC) to authenticate the UE 110. If the UE 110 does not subscribe to the mobile communication network 100, but desires to use a service through the mobile communication network 100, the following operations may be performed.

The UICC of the UE 110 may store an identical group key, which is specific for the SP 150 or the GVNO 140, in addition to the separate security key K. UEs sold by the same SP 150 or GVNO 140 have an identical group key from their releases to the market, and the group key attempts attachment to the mobile communication network 100 to be granted a limited access permission.

The SP 150 makes an attach contract with the GVNO 140 in advance to allow the UE 110 to be attached to a service of the SP 150 through the mobile communication network 100. Before the UE 110 attempts attachment to the mobile communication network, the SP 150 delivers an IMSI, which is a unique device identity of the UE 110, a URI indicating an address to which the UE 110 needs to attach for authentication with the SP 150, and a QoS profile that the mobile communication network 100 has to guarantee in authentication between the LIE 110 and the SP 150 to the GVNO 140, according to the contract. The GVNO 140 manages a group key specific for the SP 150 or manages a common group key for all UEs to be served by the GVNO 140, if necessary.

Referring to FIG. 8, in operation 805, the GVNO 140 provisions the IMSI of the UE 110 to which a mobile communication service contracted with the SP 150 is to be provided and the group key to the HSS 180 of the mobile communication network 100. While operations of one mobile communication network will be described below, the GVNO 140 may also provide information related to the UE 110 to a plurality of mobile communication networks. For example, in operation 205, the GVNO 140 may transmit an IMEI Provisioning message including the IMEI of the UE 110 to EIRs of the plurality of mobile communication networks. Likewise, the GVNO 140 may deliver IMEIs of a plurality of contracted UEs to an EIR of each mobile communication network. The plurality of IMEIs may be delivered to each EIR through one message or separate messages.

In operation 810, the GVNO 140 provides a GVNO Information Provisioning message including a GVNO identity for identifying the GVNO 140, a URI to which the UE 110 connects in an authentication procedure between the UE 110 and the SP 150, and a QoS profile the mobile communication network 100 has to guarantee in the authentication procedure to a PCRF (or SPR) 160 of the mobile communication network 100.

In operation 815, the UE 110 sends an Attach Request message to the MME 120 to attempt to attach to the mobile communication network 100. The Attach Request message includes the IMSI of the UE 110 such as a typical attach request.

In operation 820, the MME 120 delivers an Authentication Information Request message requesting an authentication vector (AV) with respect to the attach-requesting UE 110 to the HSS 180. In operation 825, the HSS 180 obtains a group key corresponding to the IMSI of the UE 110 provided by the MME 120 based on information provided in advance from the GVNO 140 in operation 805. The HSS 180 generates a cipher key (CK) and an integrity key (IK) by using the group key. In this case, a plurality of UEs may attempt attachment to or may have been attached to the identical mobile communication network 100 using an identical group key. However, the HSS 180 uses a different sequence number (SQN) and a different random value (RAND) for every generation of the CK and the IK as input parameters, such that even UEs having an identical group key are assigned with different CKs and IKs.

In operation 830, the HSS 180 sends an Authentication Information Answer message including the AV having the generated CK and IK and the GVNO identity corresponding to the IMSI of the UE 110 to the MME 120. The MME 120 sends an Authentication Request message to the UE 110 using the AV in operation 835, and authenticates the UE 110 by receiving an Authentication Response message corresponding to the Authentication Request message in operation 840.

The MME 120 having completed identification of the UE 110 through the procedure may configure the UE 110 to perform a limited access to the mobile communication network 100. The limited access means a state where the UE 110 is permitted to perform communication only for authentication with the SP 150 in the mobile communication network 100 of the MME 120.

In operation 845, the MME 120 sends a Create Session Request message to the gateway 130 to initiate a procedure for configuring an evolved packet system (EPS) session and a default bearer. The Create Session Request message includes at least one of the IMSI of the UE 110, the GVNO identity, a default QoS profile, and charging characteristics.

In operation 850, the gateway 130 delivers information necessary for deciding a policy such as the IMSI of the UE 110 and the GVNO identity to the PCRF/SPR 160 through a CCR message, to obtain information for policy control such as allocation of resources and a QoS needed for creating the EPS session for the UE 110.

In operation 855, the PCRF/SPR 160 decides a PCC policy for the EPS session to be created, based on the GVNO identity delivered from the gateway 130. Although the PCRF and the SPR are illustrated together in the illustrated example, the PCC policy may also be decided through message exchange between the PCRF and the SPR if the PCRF and the SPR exist as separate entities in another embodiment. The PCC policy decided as described above includes a limited access policy that allows only corresponding traffics such that the UE 110 performs authentication with the SP 150. For example, the PCC policy may permit only traffics having a destination IP address destined to an authentication server of the SP 150 and block or redirect other traffics to the authentication server of the SP 150.

In operation 855, the PCRF/SPR 160 delivers the decided PCC policy to the gateway 130 through a CCA message. The CCA message includes the IMSI of the UE 110 and the PCC rules, and the PCC rules include at least one of an SDF filter, a QCI, an ARP, an APN-AMBRG, and a charging rule according to the PCC policy for the limited access.

In operation 860, the gateway 130 installs the PCC rules received from the PCRF/SPR 160. This means that the PCC rules starts to be applied to user traffics related to the UE 110 introduced to the gateway 130.

In operation 865, the gateway 130 sends a Create Session Response message including the IP address of the UE 110 and the authorized QoS profile to the MME 120 to notify the MME 120 that configuration of the EPS session and the default bearer has been completed. The authorized QoS profile indicates a QoS applied to the EPS session and the default bearer.

In operation 870, the MME 120 sends the IP address and a QoS parameter (i.e., the authorized QoS profile, etc.) of the UE 110 allocated by the gateway 130 to the UE 110 through an Attach Accept message in response to the Attach Request message sent by the UE 110.

Figure 9:
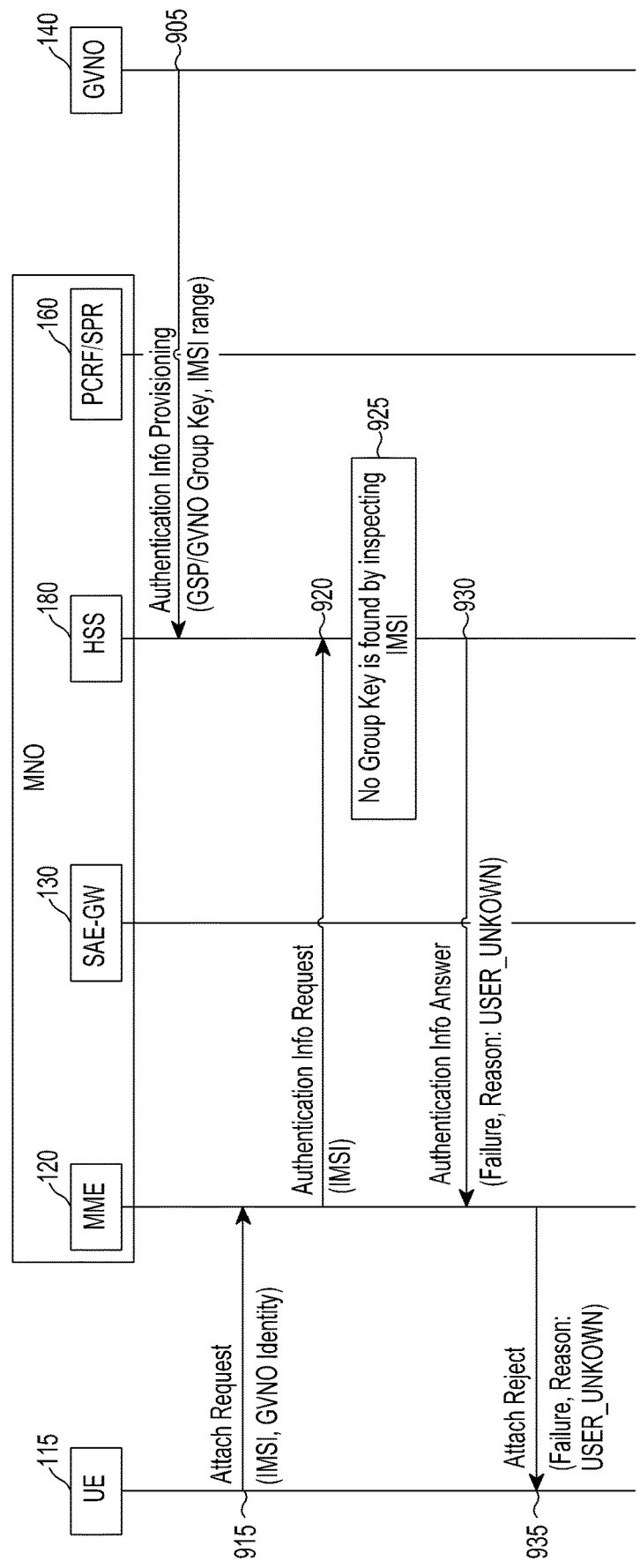
FIG. 9 is a message flowchart of a procedure in which a non-subscribing UE attempts attachment to a mobile communication network to which an access of the UE is not granted according to another embodiment of the present disclosure.

FIG. 9 is a message flowchart of a procedure in which a non-subscribing terminal attempts attachment to a mobile communication network to which an access of the terminal is not granted according to another embodiment of the present disclosure. In the illustrated example, a UE 115 has a UICC, but does not subscribe to the mobile communication network 100, and the mobile communication network 100 does not have limited access permission for the UE 115.

Referring to FIG. 9, in operation 905, the GVNO 140 provisions, as ID information of at least one UE to which a mobile communication service contracted with the SP 150 is to be provided, a group key and an IMSI range for the SP 150 or the GVNO 140, to the HSS 180 of the mobile communication network 100. In operation 915, the UE 115 sends an Attach Request message including the IMSI and the GVNO identity to the MME 120 to attempt attachment to the mobile communication network 100. In operation 920, the MME 120 sends an Authentication Information Request message including the IMSI of the UE 115 to the HSS 180 to request an AV for the UE 115. In operation 925, the HSS 180 determines whether a group key for the IMSI of the UE 115 is registered. If the IMSI of the UE 115 is not registered in the HSS 180, it means that the GVNO 140 contracted with the mobile communication network 100 to which the UE 115 attempts to be attached does not support the UE 115 or a GVNO supporting the UE 115 does not make a contract with the mobile communication network 100 to which the UE 115 attempts to be attached. After determining that the IMSI of the UE 115 is not registered, the HSS 180 sends an Authentication Information Answer message including USER_UNKNOWN as a result code to the MME 120 in operation 930. In operation 935, the MME 120 sends an Attach Reject message including the result code to the UE 115 to notify that attachment to the mobile communication network 100 is not allowed.

Figure 10A:
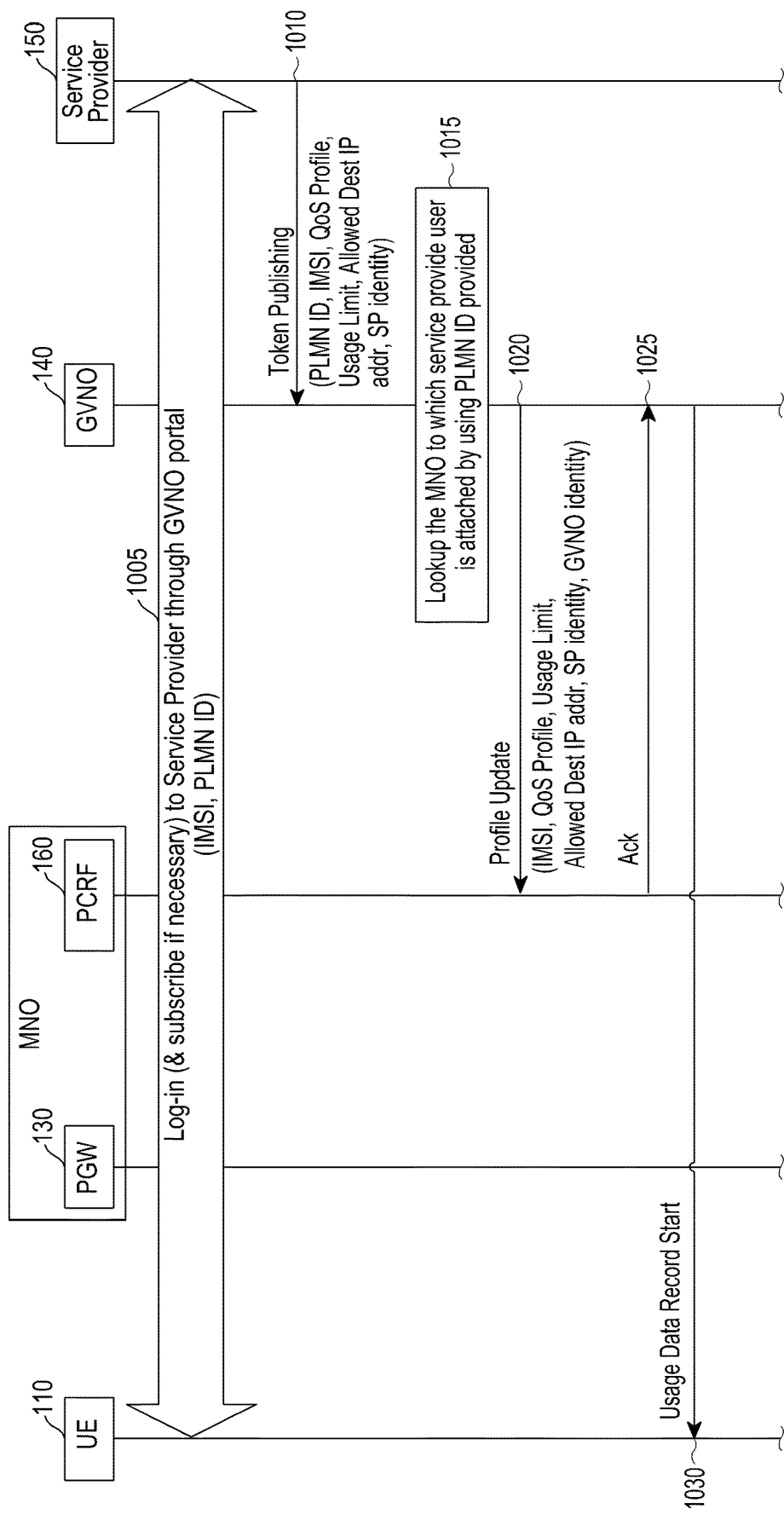
FIG. 10 (including FIGS. 10A and 10B) is a message flowchart of a procedure in which an EPS session generated in a mobile communication network is updated by a token issued by an SP according to another embodiment of the present disclosure.
Figure 10B:
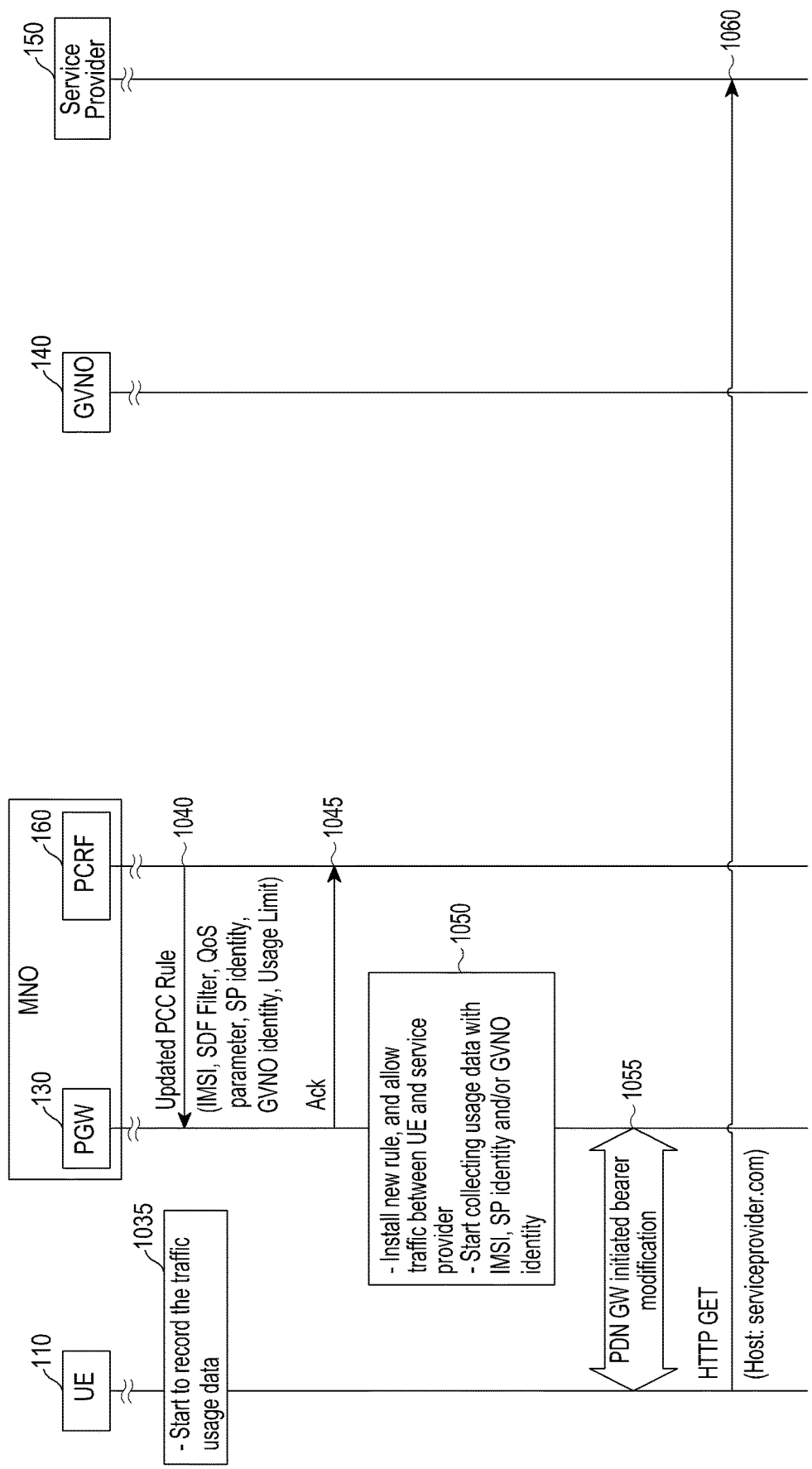

FIG. 10 (including FIGS. 10A and 10B) is a message flowchart of a procedure in which an EPS session generated in a mobile communication network is updated by a token issued by an SP according to another embodiment of the present disclosure. Herein, the UE 110 has a UICC, but does not subscribe to the mobile communication network 100 to which the UE 110 desires to be attached.

Referring to FIG. 10, in operation 1005, the UE 110 performs message exchange for authentication with the SP 150 through the GVNO 140. For authentication between the two entities 110 and 150, various schemes such as a user log-in using an ID/password of a website or an OAuth 2.0 protocol may be used. Through the authentication procedure, the UE 110 delivers, to the SP 150, the IMSI, which is a device identity of the UE 110, and a PLMN ID, which is an identity of the mobile communication network 100 to which the UE 110 is in a limited access.

After determining the validity of the UE 110 in operation 1005, the SP 150 sends a Token Publishing message to the GVNO 140 to request provisioning of a data service from a device corresponding to the IMEI through the mobile communication network 100 corresponding to the PLMN ID delivered from the UE 110 in operation 1010. The Token Publishing message may include at least one of the PLMN ID of the mobile communication network 100, the of the UE 110, the QoS profile which has to be satisfied when a service is provided to the UE 110, a usage limit indicating a maximum data allowance or allowable period to be allowed to the UE 110, and a destination IP address to which attachment is to be allowed to the UE 110. The usage limit means a maximum data usage (or usage amount) available to the UE 110 for the service of the SP 150.

In operation 1015, the GVNO 140 identifies the PCRF 160 of the mobile communication network 100 to which the UE 110 is currently attached to, based on the PLMN ID provided by the SP 150. In operation 1020, the GVNO 140 sends a Profile Update message for requesting update of a policy of the UE 110 in the limited access state to the PCRF 160. The Profile Update message may include information about the policy, together with the IMSI of the UE 110 to which the policy is to be applied. The information about the policy may include at least one of the QoS profile the mobile communication network 100 has to provide when the service is provided to the UE 110, a usage limit indicating a maximum data allowance or allowable period to be allowed to the UE 110, an identity of the SP 150 and an identity of the GVNO 140 to be used as charging criteria, and a destination IP address to which attachment is to be allowed to the UE 110. In operation 1025, the PCRF 160 updates the policy and delivers an ACK message to the GVNO 140.

The GVNO 140 delivers a Usage Data Record Start message instructing initiation of recording of a data usage to the UE 110 in operation 1030, and the UE 110 starts recording the amount of data traffics transmitted and received by the UE 110 in response to the reception of the Usage Data Record Start message in operation 1035.

In operation 1040, the PCRF 160 delivers information about the updated policy to the SAE-GW 130 through an updated PCC rule message. The updated PCC rule message may include at least one of the IMSI, which is an identity of the UE 110 to which the policy is to be applied, an SDF filter that limits a destination to which the UE 110 may attach (e.g., to a server of the SP), a QoS profile the mobile communication network 100 has to provide when a service is provided to the UE 110, a usage limit indicating a maximum data allowance or allowable period to be allowed to the UE 110, and an identity of the SP 150 and an identify of the GVNO 140 to be used as charging criteria. In operation 1045, the gateway 130 sends an ACK message to the PCRF 160 to notify the PCRF 160 of normal reception of the PCC rule message.

In operation 1050, the gateway 130 installs the updated policy received from the PCRF 160 and allows traffics between the UE 110 and the SP 150 according to the updated policy. Thus, the UE 110 becomes connectable with the server of the SP 150 and is guaranteed with the QoS and the data allowance designated in the policy. The gateway 130 starts recording the data usage of the UE 110. The unit of recording may be a device (IMEI), an SP (SP identity), a GVNO (GVNO identity), or a combination of at least two of them, for convenience of charging and calculation.

In operation 1055, the gateway 130 initiates bearer modification of the UE 110, through which the QoS policy applied to a path between the UE 110 and the gateway 130 is updated.

In operation 1060, the UE 110 delivers the HTTP GET message to the SP 150 through the gateway 130, thus being provided with the service of the SP 150 through the mobile communication network 100.

Figure 11A:
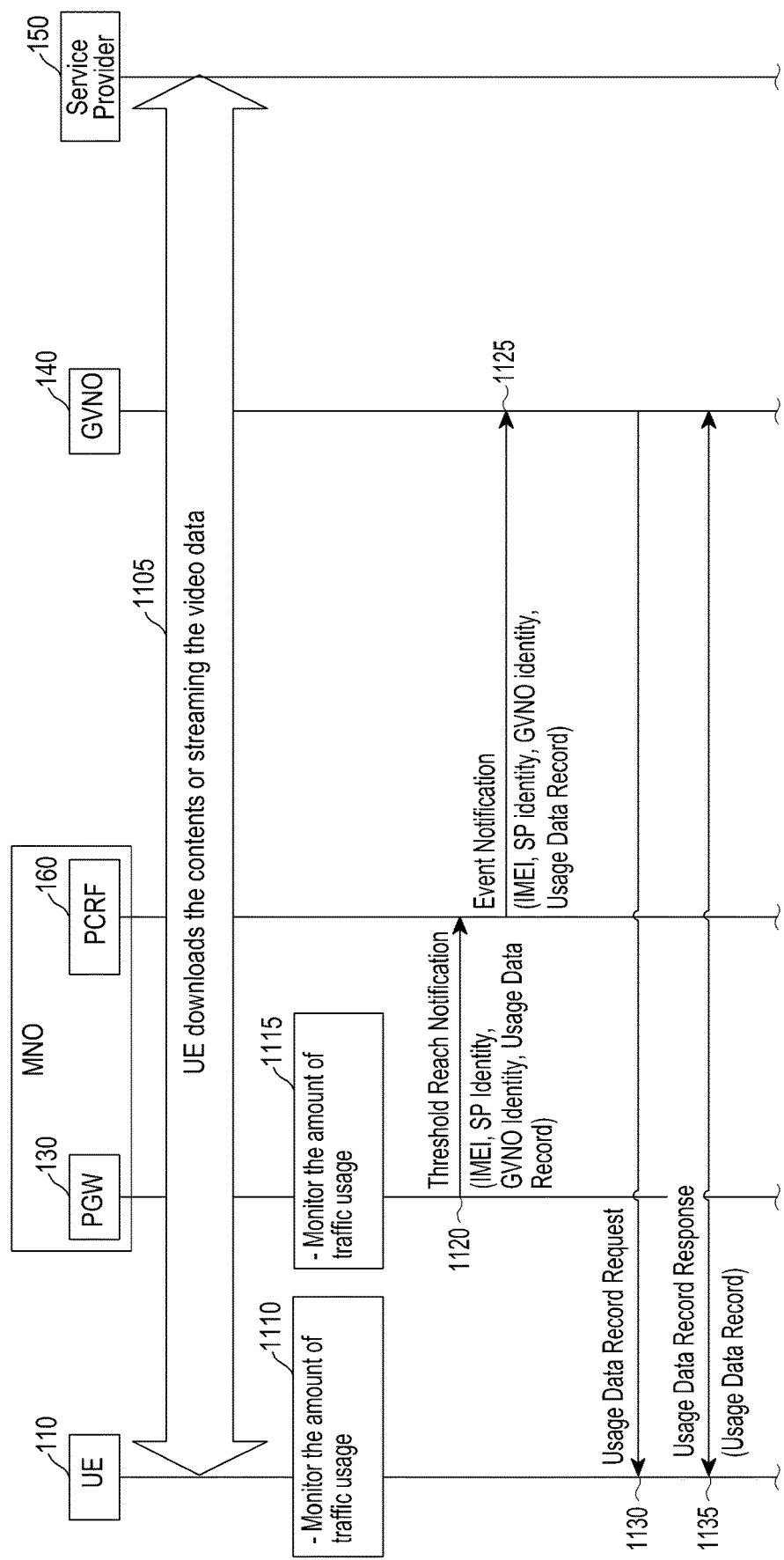
FIG. 11 (including FIGS. 11A and 11B) is a message flowchart of a procedure in which an EPS session generated in a mobile communication network is updated by a token re-issued by an SP according to an embodiment of the present disclosure.
Figure 11B:
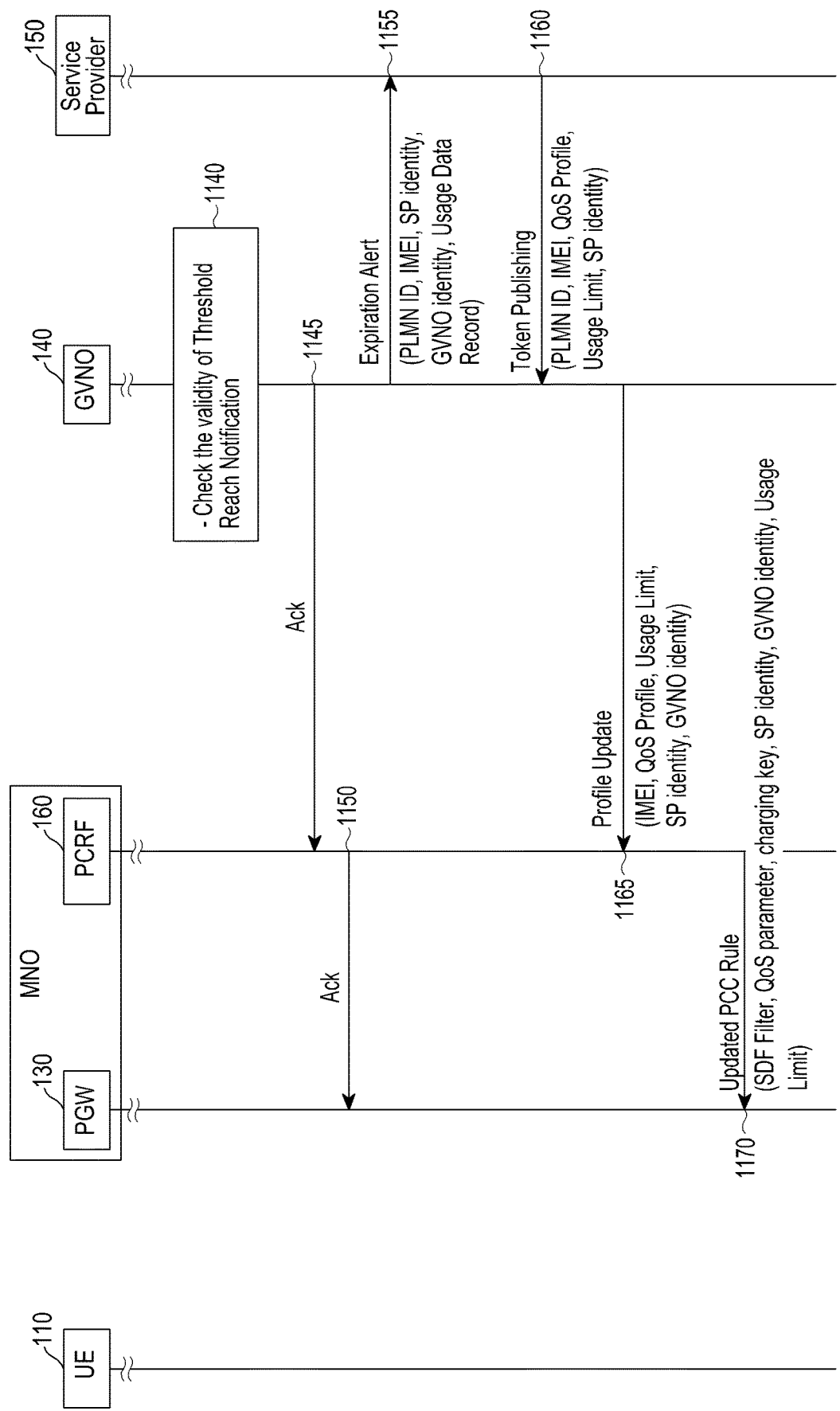

FIG. 11 (including FIGS. 11A and 11B) is a message flowchart of a procedure in which an EPS session generated in a mobile communication network is updated by a token re-issued by an SP according to an embodiment of the present disclosure. Herein, the UE 110 has a UICC, but does not subscribe to the attached mobile communication network 100, and has been authenticated by the SP 150.

Referring to FIG. 11, in operation 1105, the UE 110 uses a service (e.g., content downloading or video streaming) from the SP 150 through the mobile communication network 100. In operations 1110 and 1115, the UE 110 and the gateway 130 of the mobile communication network 100 record a service-based data usage, respectively. The UE 110 may be configured to deliver a usage data record to the GVNO 140 periodically or at the request of the GVNO 140. The gateway 130 may be configured to notify the PCRF 160 of an excess of the usage data record over a maximum data allowance determined by the policy, if the usage data record exceeds the maximum data allowance.

In operation 1120, the gateway 130 detects that the data usage of the UE 110 exceeds the maximum data allowance and sends a Threshold Reach Notification message indicating so to the PCRF 160. The Threshold Reach Notification message may include the IMSI, which is the identity of the UE 110, the identity of the SP 150, the identity of the GVNO 140, and the usage data record. In operation 1125, the PCRF 160 delivers the information included in the Threshold Reach Notification message to the GVNO 140 through an Event Notification message.

The GVNO 140 may request a usage data record of the UE 110 to verify the notification from the gateway 130 if determining that it is necessary to do so. In operations 1130 and 1135, the GVNO 140 sends, to the UE 110, a request for reporting a usage data record the UE 110 has collected, and receives the usage data record of the UE 110 in response to the request, respectively. In operation 1140, the GVNO 140 cross-checks the usage data record collected by the gateway 130 of the mobile communication network 100 and the usage data record collected by the UE 110 to verify the usage data record notified by the gateway 130. If determining that a difference between the two usage data records is significantly large, the GVNO 140 may request the gateway 130 to re-check the usage data record. Additionally, the GVNO 140 may use a check result of the usage data record as a criterion for determining whether to maintain the contract with the mobile communication network 100. If determining that the usage data records of the UE 110 and the gateway 130 match each other or a difference therebetween is relatively ignorable, the GVNO 140 delivers an ACK message to the gateway 130 through the PCRF 160 in operations 1145 and 1150.

The GVNO 140 determines whether the verified usage data record of the UE 110 reaches or is very close to a maximum data usage specified in a token issued by the SP 150 within a predetermined range. If the usage data record of the UE 110 reaches (or is close to) the maximum data usage, the GVNO 140 delivers, to the SP 150, an Expiration Alert message indicating that the UE 110 entirely (or almost) consumes the data usage specified in the token issued by the SP 150 in operation 1155. The Expiration Alert message may include the PLMN ID, the IMSI, the SP identity, the GVNO identity, and the usage data record.

In response to the Expiration Alert message, the SP 150 determines whether additional data service permission is needed for the UE 110. If determining to allow additional data use to the UE 110, the SP 150 re-issues a token for allowing the additional data use, and in operation 1160, the SP 150 sends a Token Publishing message for requesting continuous provisioning of a data service to the UE 110 through the mobile communication network 100 to the GVNO 140. The Token Publishing message may include at least one of the PLMN ID, the IMSI, the QoS profile, the usage limit based on the re-issued token, the allowed destination IP address, and the SP identity.

Information included in the Token Publishing message is delivered to the PCRF 160 through a Profile Update message to the PCRF 160 in operation 1165, and delivers a usage limit based on the re-issued token to the gateway 130 through an Updated PCC Rule message in operation 1170. The gateway 130 installs an additional maximum data allowance according to the updated PCC rules, and prepares for allowing the UE 110 to be continuously attached to the server of the SP 150.

Figure 12:
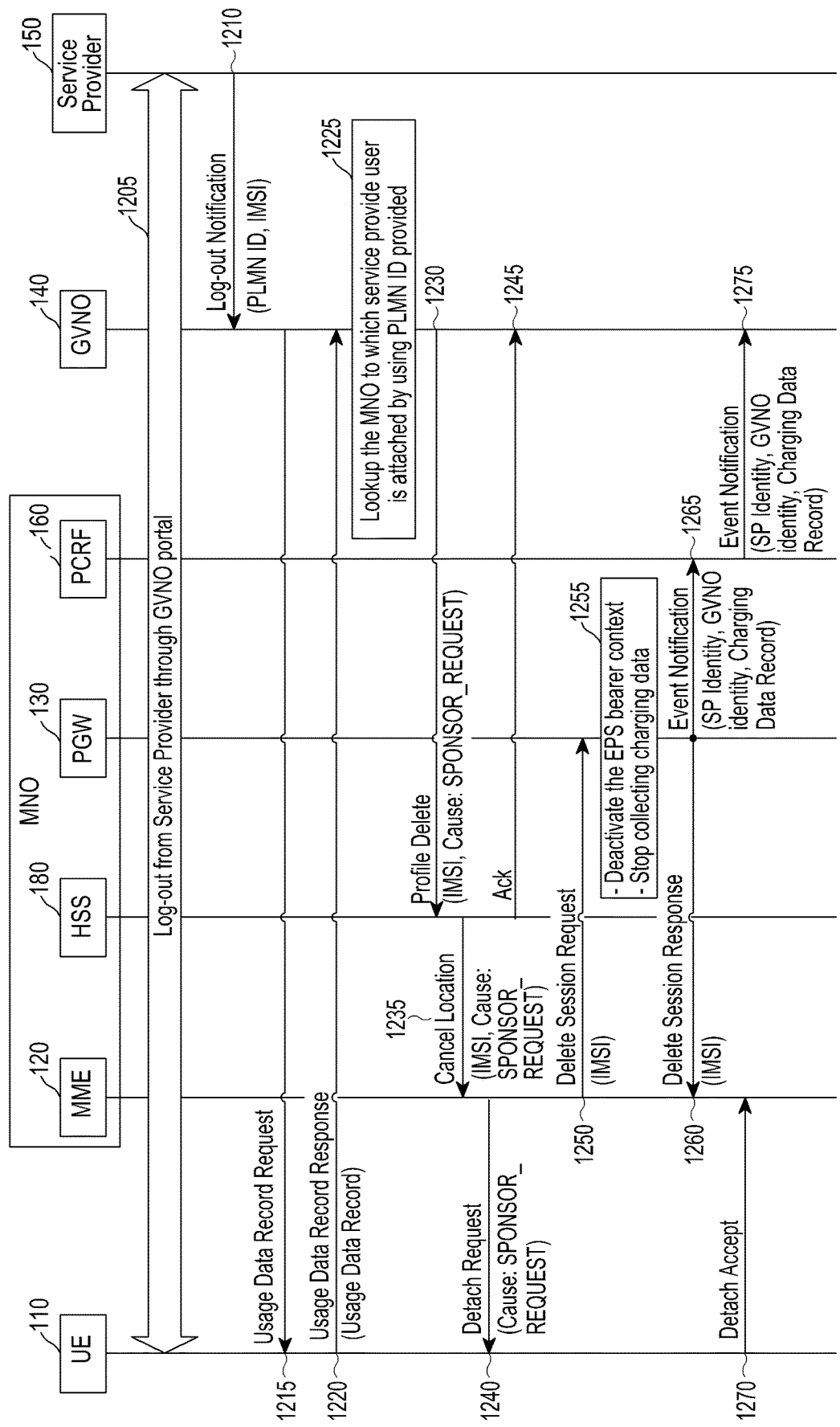
FIG. 12 is a message flowchart of a procedure in which an EPS session generated in a mobile communication network is released by a notification of an SP according to another embodiment of the present disclosure.

FIG. 12 is a message flowchart of a procedure in which an EPS session generated in a mobile communication network is released by a notification of an SP according to another embodiment of the present disclosure. In the illustrated example, the UE 110 has a UICC, but does not subscribe to the mobile communication network 100 to which the UE 110 is attached.

Referring to FIG. 12, in operation 1205, the UE 110 exchanges messages of an application layer for releasing authentication with the SP 150 through the GVNO 140. The release of authentication may be similar with user log-out of a website, or may use various schemes such as an OAuth 2.0 protocol.

In operation 1210, the SP 150 sends a Log-out Notification message including the PLMN ID and the IMSI to the GVNO 140 to request the release of the EPS session of the UE 110, identified by the IMSI, which is attached to the mobile communication network. 100 identified by the PLMN ID.

The GVNO 140 requests the UE 110 to return a usage data record in response to reception of the Log-out Notification message in operation 1215, and the UE 110 returns the usage data record to the GVNO 140 in operation 1220. The usage data record collected from the UE 110 is to be used for the GVNO 140 to verify a usage data record received from the mobile communication network 100 for calculation.

In operation 1225, the GVNO 140 identifies the HSS 180 of the mobile communication network 100 to which the UE 110 is currently attached, based on the PLMN ID provided by the SP 150.

In operation 1230, the GVNO 140 delivers, to the HSS 180, a Profile Delete message for requesting detachment of the UE 110 identified by the IMSI from the mobile communication network 100. The Profile Delete message may include the IMSI of the UE 110 to be detached and a code SPONSOR_REQUEST indicating a reason for detachment. The code SPONSOR_REQUEST means that the detachment of the UE 110 is requested at the request of the SP 150, which is a sponsor.

In operation 1235, the HSS 180 initiates a procedure for detaching the UE 110 from the mobile communication network 100 by sending a Cancel Location message to the MME 120. The Cancel Location message may include the IMSI, which is a device identity of the UE 110, and a code indicating a reason for detachment. In operation 1245, the HSS 180 delivers, to the GVNO 140, an ACK message in response to the Profile Delete message.

In operation 1240, the MME 120 sends a Detach Request message to the UE 110 to allow the UE 110 to be detached from the mobile communication network 100. The Detach Request message may include a code indicating a reason for detachment. In operation 1250, the MME 120 delivers a Delete Session Request message including the IMEI to the gateway 130 to initiate release of the EPS session including a bearer for the UE 110 identified by the IMEI.

In operation 1255, the gateway 130 deletes information of the EPS session related to the UE 110 identified by the IMEI and stops collecting a usage data record related to the UE 110. The gateway 130 delivers a Delete Session Response message to the MME 120 in response to the Delete Session Request message in operation 1260, and delivers the usage data record collected for the UE 110 as a charging data record for charging and calculation to the PCRF 160 through an Event Notification message in operation 1265.

In operation 1270, the UE 110 delivers a Detach Accept message to the MME 120 in response to the Detach Request message in operation 780.

In operation 1275, the PCRF 160 of the mobile communication network 100 delivers the charging data record delivered from the gateway 130 to the GVNO 140 to allow the GVNO 140 to perform charging and calculation.

Figure 13:
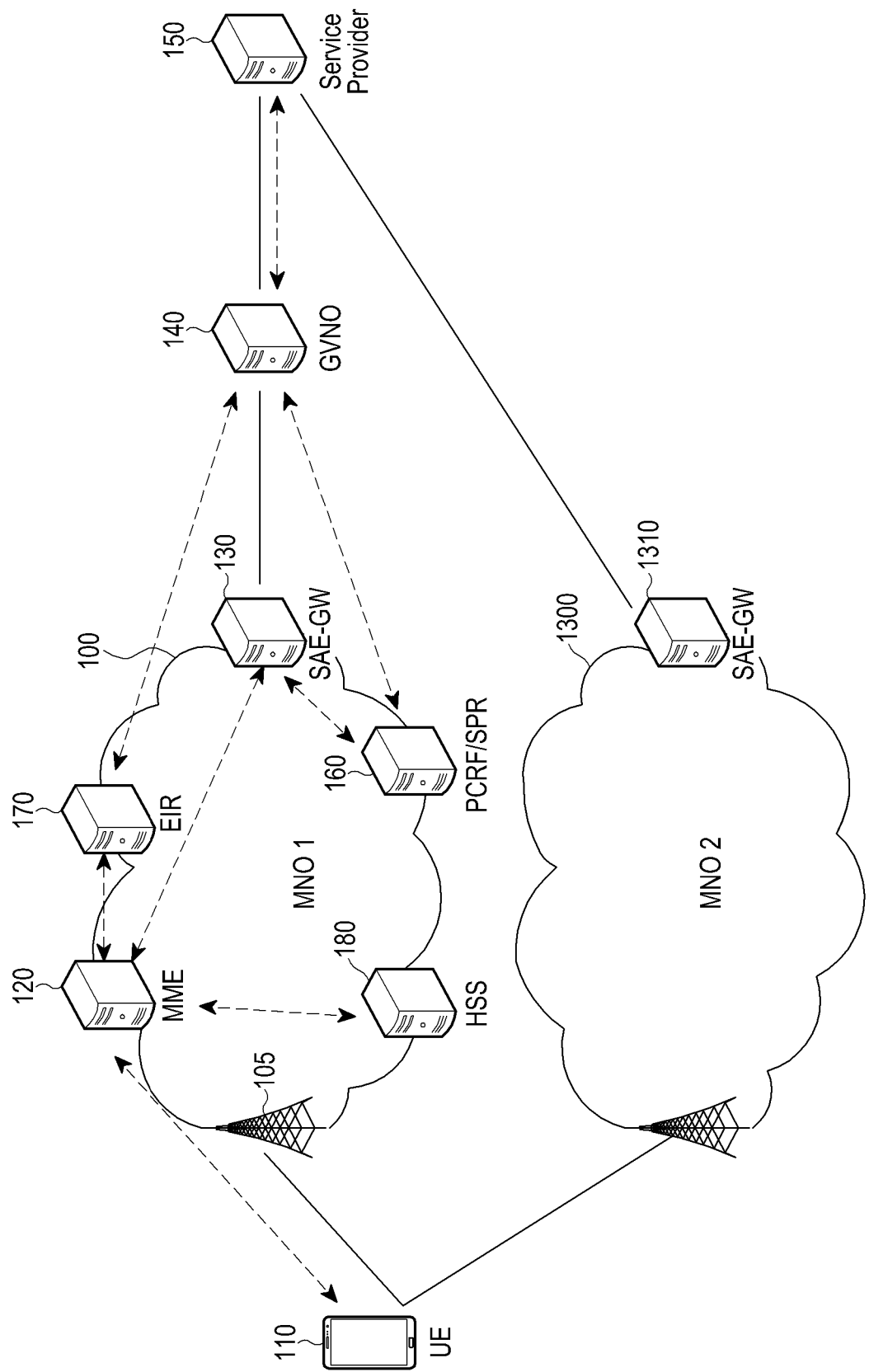
FIG. 13 is a structural diagram of a system for supporting sponsored data connectivity for a UE that does not subscribe to a mobile communication network through the mobile communication network according to an embodiment of the present disclosure.

FIG. 13 is a structural diagram of a system for supporting sponsored data connectivity for a UE that does not subscribe to a mobile communication network through the mobile communication network according to an embodiment of the present disclosure.

Referring to FIG. 13, the mobile communication network 100 operated by an MNO 1 may include the eNB 105, the MME 120, the SAE-GW 130, the PCRF/SPR 160, the EIR 170, and the HSS 180, and has a limited access contract for the UE 110 with the SP 150 and the GVNO 140.

The UE 110 subscribes to a mobile communication network 1300 operated by an MNO 2, or the mobile communication network 1300 is a roaming partner of an MNO (not shown) to which the UE 110 subscribes. Thus, the UE 110 may be attached to the SP 150 through an SAE-GW 1310 of the mobile communication network 1300. However, the operator of the mobile communication network 1300 does not make a contract for payment by proxy for a limited access with the GVNO 140.

The UE 110 performs authentication with the SP 150 through the mobile communication network 1300, and then is provided with a service from the SP 150 through the mobile communication network 100 to which the UE 110 does not subscribe.

Figure 14:
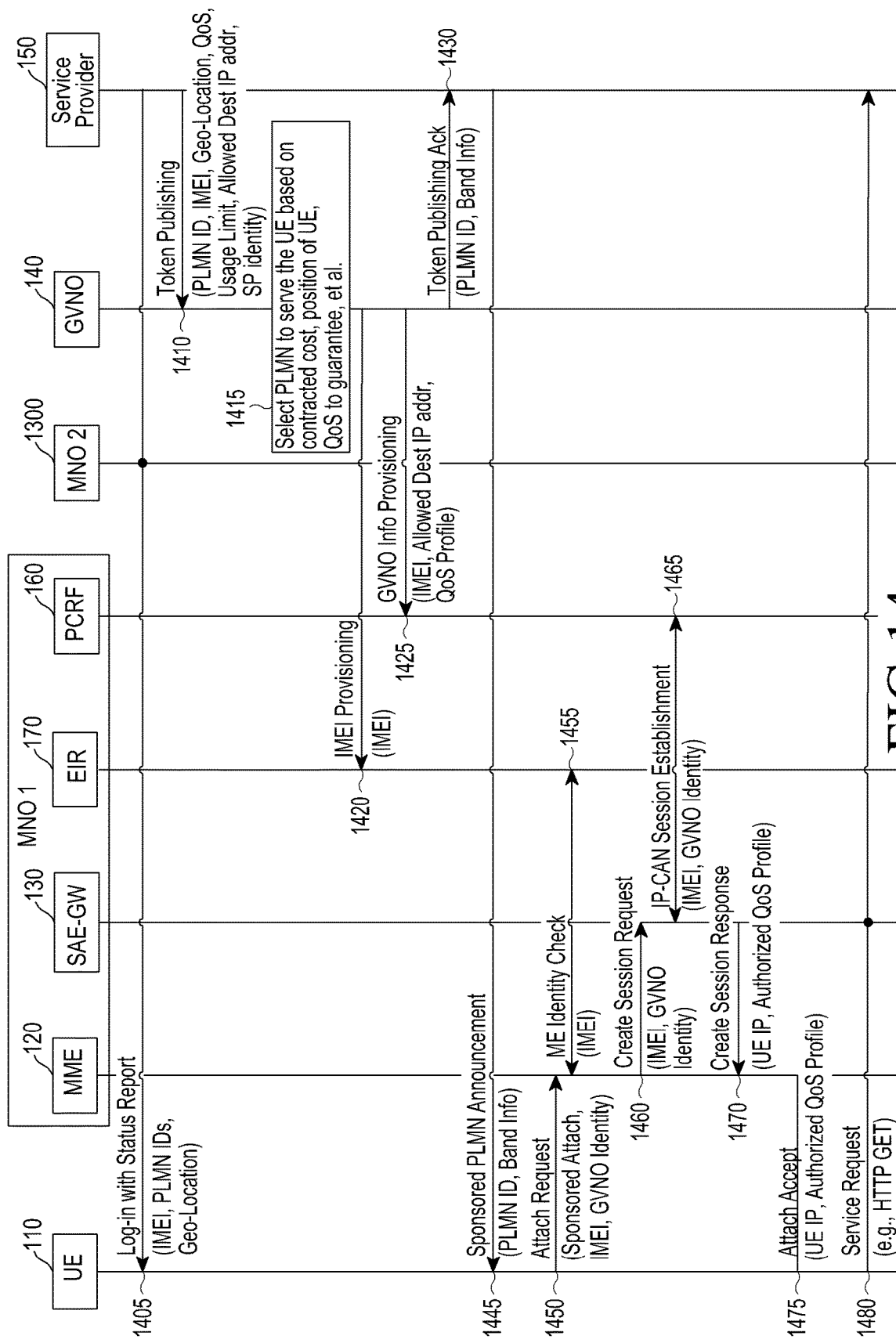
FIG. 14 is a message flowchart of a procedure in which a UE performs authentication with an SP using a mobile communication network to which the UE subscribes and then accesses a service of the service provider through a mobile communication network to which the UE does not subscribe according to an embodiment of the present disclosure.

FIG. 14 is a message flowchart of a procedure in which a UE performs authentication with an SP using a mobile communication network to which the UE subscribes and then accesses a service of the service provider through a mobile communication network to which the UE does not subscribe according to an embodiment of the present disclosure.

Referring to FIG. 14, in operation 1405, the UE 110 exchanges messages for authentication with a server of the SP 150 using the mobile communication network 1300 of the MNO 2. For authentication between the two entities 110 and 150, various schemes such as a user log-in using an ID/password of an website or an OAuth 2.0 protocol may be used. Through the foregoing authentication procedure, the UE 110 delivers, to the SP 150, the IMEI, which is a device identity of the UE 110, location information indicating a current geographic location of the UE 110, and the PLMN ID, which is an identity of at least one mobile communication network found in the current location of the UE 110.

In operation 1410, the SP 150 transmits the Token Publishing message including the device identity IMEI, the location information, and the PLMN ID(s), delivered from the UE 110, to the GVNO 140, such that the GVNO 140 allows the UE 110 to be attached to the SP 150 through a proper mobile communication network. The Token Publishing message may further include at least one of the QoS profile the mobile communication network 100 has to guarantee when the service is provided to the UE 110, a usage limit to be allowed to the UE 110, an identity of the SP 150 and an identity of the GVNO 140 to be used as charging criteria, and a destination IP address to which attachment is to be allowed to the UE 110.

In operation 1415, the GVNO 140 selects the mobile communication network 100 which is to serve the UE 110 based on information (the location of the UE 110, the QoS to be allowed) delivered from the SP 150 through the Token Publishing message and a contract (contracted cost) with mobile network operators.

In operation 1420, the GVNO 140 registers the IMEI of the UE 110 in the EIR 170 of the selected mobile communication network 100. In operation 1425, the GVNO 140 delivers, to the PCRF 160 of the selected mobile communication network 100, a GVNO Information Provisioning message including information such as the device identity IMEI of the UE 110 to be served, the destination address list to be allowed to the UE 110, and the QoS profile to be guaranteed in the mobile communication network 100.

In operation 1430, the GVNO 140 returns a Token Publishing ACK message to the SP 150. The Token Publishing ACK message may include the PLMN ID for identifying the mobile communication network 100 selected by the GVNO 140 for attachment of the UE 110 and frequency information needed for attachment of the mobile communication network 100.

In operation 1445, the SP 150 sends, to the UE 110, a Sponsored PLMN Announcement message indicating the mobile communication network 100 for payment by proxy of a usage fee of data transmission between the UE 110 and the SP 150. The PLMN Announcement message may include the PLMN ID, which is an identity of the mobile communication network 100, and the frequency information needed for attachment to the mobile communication network 100.

In operation 1450, the UE 110 sends an Attach Request message to the MME 120 to attempt attachment to the mobile communication network 100. In this case, the UE 110 has not subscribed to the mobile communication network 100. A typical mobile communication network does not accept an attempt for attachment by a non-subscribing UE, and thus to allow attachment by the non-subscribing UE 110, a special attachment delimiter is needed. To this end, a code indicating a new attachment type called 'Sponsored Attach' is added to an Attach Request message to be sent by the UE 110. The MME 120 detects a sponsored attach type of the Attach Request message and checks the GVNO 140 identified by a GVNO identity delivered through the Attach Request message to determine whether to provide a service to the UE 110 through the mobile communication network 100. The UE 110 delivers the unique identity, IMEI, to the MME 120 through the Attach Request message.

In operation 1455, the MME 120 sends an ME Identity Check message including the IMEI of the UE 110 to the EIR 170 to determine whether the attach-requesting UE 110 corresponds to a contract for allowing a limited access. The EIR 170 determines that the IMEI of the attach-requesting UE 110 is stored in an internal repository, and then returns an ECA message to the MME 120.

The MME 120 having completed identification of the UE 110 through the procedure may configure the UE 110 to perform a limited access to the mobile communication network 100. In operation 1460, the MME 120 sends a Create Session Request message to the gateway 130 to initiate a procedure for configuring an evolved packet system (EPS) session and a default bearer. The Create Session message may include the IMEI instead of the IMSI, and may further include the GVNO identity and the default QoS profile.

In operation 1465, the gateway 130 delivers the UE identity IMEI received from the MME 120 and information necessary for deciding a policy to the PCRF/SPR 160 through a CCR message, to obtain information for policy control such as allocation of resources and a QoS needed for creating the EPS session for the UE 110. The PCRF/SPR 160 delivers the PCC policy provided by the GVNO 140 in operation 1425 to the gateway 130 through the CCA message. The CCA message may include the IMEI and the PCC rules, and the PCC rules may include at least one of the SDF filter, the QCI, the ARP, the APN-AMBR, and charging rules according to the PCC policy.

According to the PCC rules received through the CCA message, the gateway 130 performs a traffic management function that allows traffics of the UE 110 used for attachment to the SP 150 by passing only the traffics therethrough and blocks other traffics of the UE 110 destined to other destinations. The gateway 130 records a data usage between the UE 110 and the SP 150 and requests calculation from the GVNO 140 if necessary, thereby providing a basis for payment by proxy for a mobile communication fee of the UE 110.

In operation 1470, the gateway 130 sends a Create Session Response message to the MME 120 to inform the QoS applied to the EPS session and the default bearer for the UE 110.

In operation 1475, the MME 120 sends information such as the IP address and a QoS parameter (i.e., the authorized QoS profile, etc. of the UE 110 allocated by the gateway 130 to the UE 110 through an Attach Accept message in response to the Attach Request message sent by the UE 110.

Figure 15:
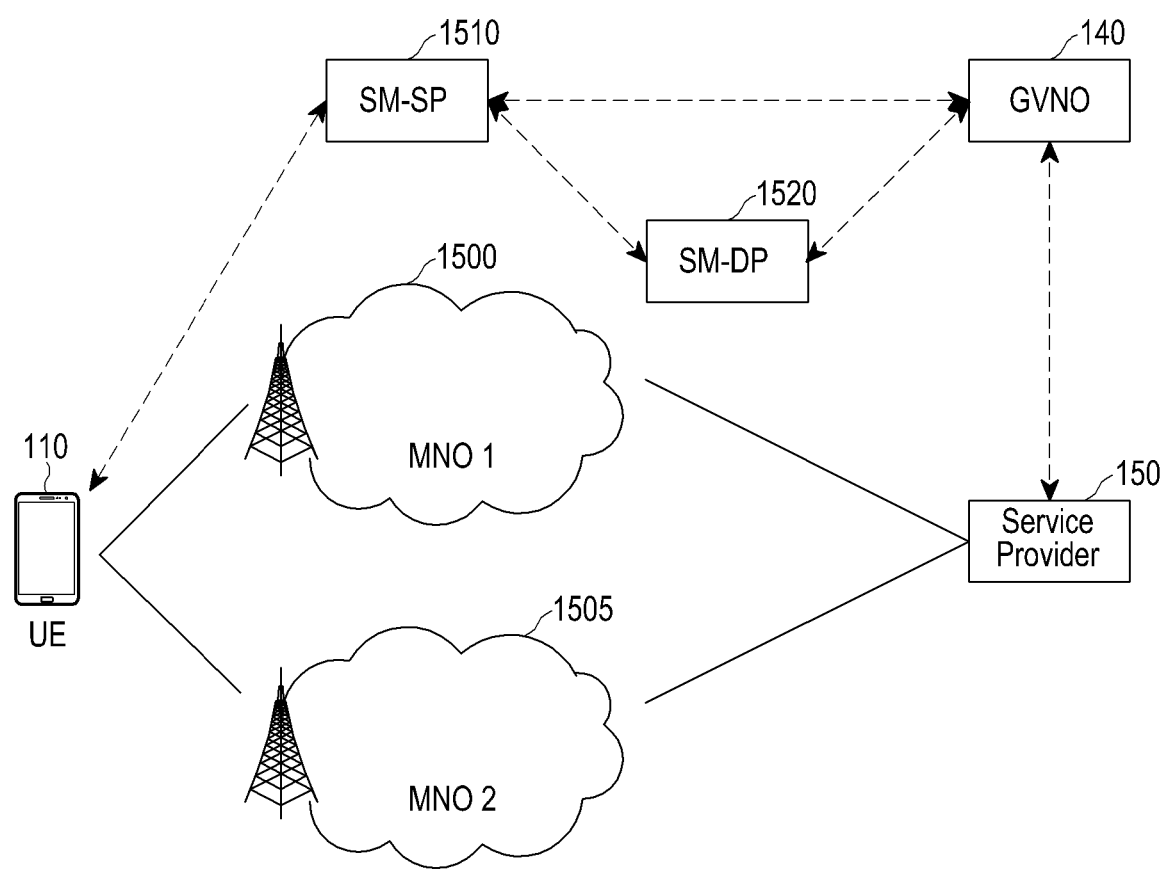
FIG. 15 is a structural diagram of a system for supporting sponsored data connectivity for a UE having an embedded subscriber authentication module according to an embodiment of the present disclosure.

FIG. 15 is a structural diagram of a system for supporting sponsored data connectivity for a UE having an embedded subscriber authentication module according to an embodiment of the present disclosure.

Referring to FIG. 15, the UE 110 has made a mobile communication subscription contract with an MNO 1 operating a mobile communication network 1 1500 for a voice and data service, and is located in a coverage of a mobile communication network 2 1505 operated by an MNO 2. The UE 110 does not have made a subscription contract with the MNO 2. Meanwhile, the MNO 1 does not make a contract for sponsored data connectivity with the GVNO 140, but the MNO 2 has made a contract for sponsored data connectivity with the GVNO 140.

A subscription manager secure routing (SM-SR) 1510 is a database for supporting an embedded UICC (eUICC) embedded in the UE 110, and manages download, enable, disable, delete, etc., for profiles of the eUICC. The SM-SR 1510 receives a eUICC information set (EIS) from a manufacturer of the eUICC, such that the eUICC is registered in the SM-SR 1510.

A subscription manager data preparation (SM-DP) 1520 generates and encrypts operator profiles for supporting the eUICC and installs the operator profiles in the eUICC. If the UE subscribes to the mobile network operator, the mobile network operator may know a eUICC ID (EID) for the eUICC of the UE, requests a profile download from the SM-DP 1520, and downloads and installs the profiles in the eUICC.

The GVNO 140 connects the SM-SR 1510 and the SM-DP 1520 with the SP 150 for sponsored data connectivity.

The following description will be made of an embodiment for activating the eUICC profile of the mobile communication network 2 1505 to which the UE 110 does not subscribe in order for the UE 110 having the eUICC to use a service of the SP 150 based on sponsored data connectivity.

Figure 16:
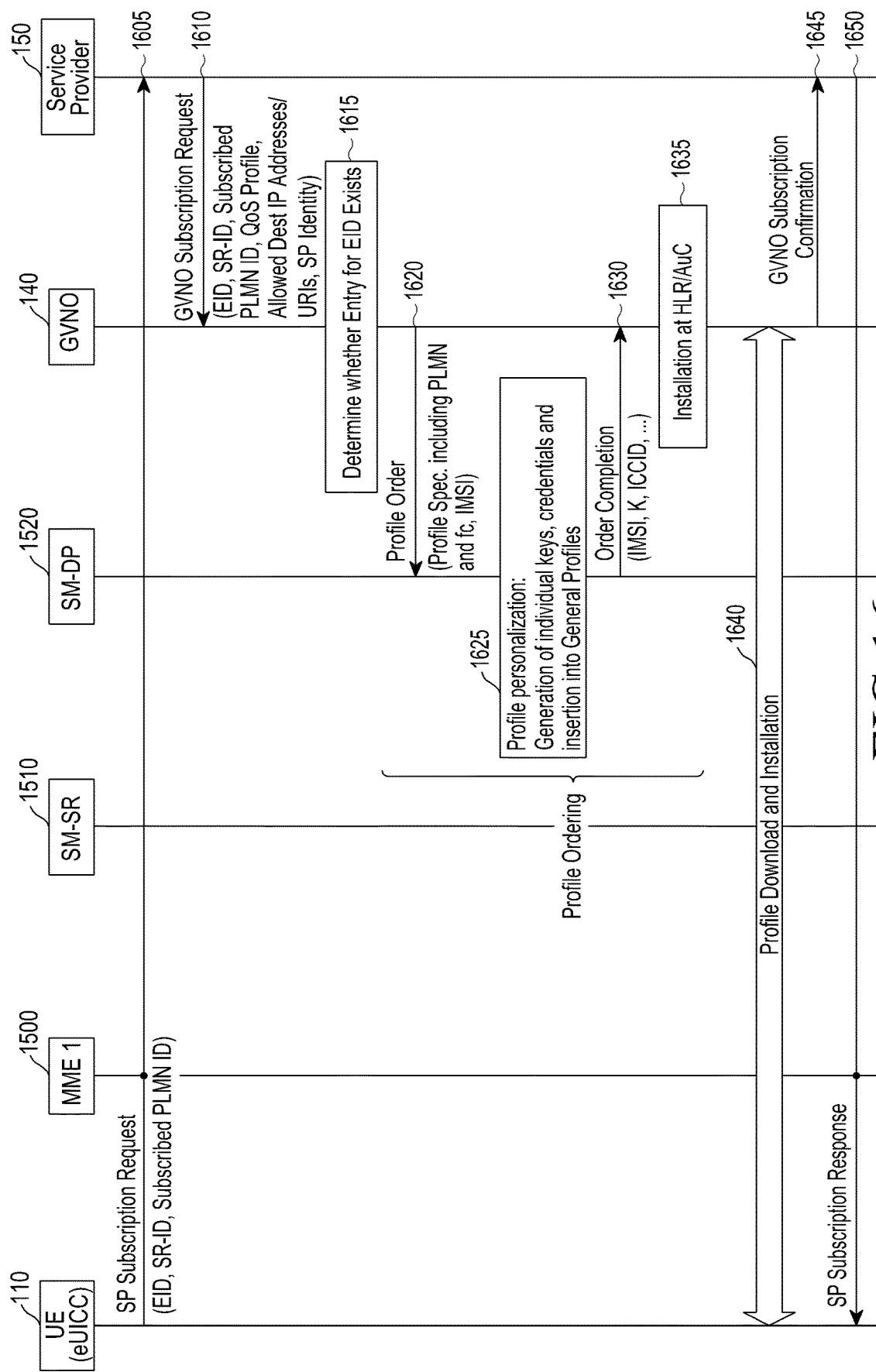
FIG. 16 is a message flowchart of a procedure in which a profile of a mobile communication network to which a UE does not subscribe is generated and downloaded and installed in the UE according to an embodiment of the present disclosure.

FIG. 16 is a message flowchart of a procedure in which a profile of a mobile communication network to which a UE does not subscribe is generated and downloaded and installed in the UE according to an embodiment of the present disclosure.

Referring to FIG. 16, in operation 1605, the UE 110 sends an SP Subscription Request message to the SP 150. The SP Subscription Request message is delivered to the SP 150 through the mobile communication network 1500 of the MNO 1 with which the UE 110 has made a subscription contract. The SP Subscription Request message may include an EID of the eUICC provided in the UE 110, an ID of an SM-SR related to the eUICC, an SRID, and a PLMN ID for identifying the MNO 1 with which the UE 110 has made the subscription contract.

In operation 1610, the SP 150 sends a GVNO Subscription Request message to the GVNO 140 in response to reception of the SP Subscription Request message. The GVNO Subscription Request message may include at least one of the EID, the SR-ID, the PLMN ID for identifying the MNO 1 to which the UE 110 subscribes, the QoS profile needed for a service of the SP 150 (e.g., including a minimum bandwidth and/or a maximum delay), a destination IP address (and/or URI) to which attachment of the UE 110 is to be allowed, and an identity of the SP.

In operation 1615, the GVNO 140 refers to the EID included in the GVNO Subscription Request message to determine whether a GVNO entry corresponding to the EID exists in the internal repository. An entry configuration of the internal repository is as shown below, and each GVNO entry includes an entry per one or more SPs.

GVNO entry:=
EID, SR-ID, Subscribed PLMN ID, Sponsored PLMN ID=Null, Candidate PLMN IDs
 [Per-Service-Provider entry]+
Per-Service-Provider entry:=
Service Provider ID, Log-in Status, QoS Profile, Allowed Dest IP Addresses/URIs If the GVNO entry corresponding to the EID does not exist, it means that a corresponding eUICC profile is not created, and thus the GVNO 140 newly creates a GVNO entry for the EID and performs a profile order procedure (operations 1620 through 1635) of ordering a profile to be recorded in the GVNO entry. On the other hand, if the GVNO entry corresponding to the EID exists already, the GVNO 140 does not newly order a profile, and updates the GVNO entry based on information received through the GVNO Subscription Request message and performs the profile order procedure.

Operations 1620 through 1635 correspond to the profile order procedure of the eUICC. More specifically, in operation 1620, the GVNO 140 sends a Profile Order message including a profile specification to the SM-DP 1520. The profile specification means contents of the eUICC profile, and includes the PLMN ID for identifying a mobile communication network (e.g., 1505 of FIG. 15) contracted with the GVNO 140 and frequency information (carrier frequency fc) used in the mobile communication network.

The SM-DP 1520 creates a separate security key and credentials in response to the Profile Order message, inserts the created security key and credentials into a profile in operation 1625, and delivers an Order Completion message to the GVNO 140 to notify completion of the profile ordering in operation 1630. The Order Completion message may include the IMSI for identifying the UE 110, the security key K, and an integrated circuit card ID (ICCID) for identifying the eUICC. In operation 1635, the GVNO 140 installs contents of the profile generated for the UE 110 in an HLR/AuC.

In operation 1640, the GVNO 140 downloads the ordered profile in the UE 110 to install the profile in the UE 110.

In operation 1645, after normally completing the profile downloading of operation 1640, the GVNO 140 sends a GVNO Subscription Confirmation message to the SP 150 to notify completion of GVNO subscription.

In operation 1650, the SP 150 sends a SP Subscription Response message to the UE 110 through the mobile communication network 1 1500 to notify completion of the subscription of the UE 110 to the service provided by the SP 150.

Figure 17A:
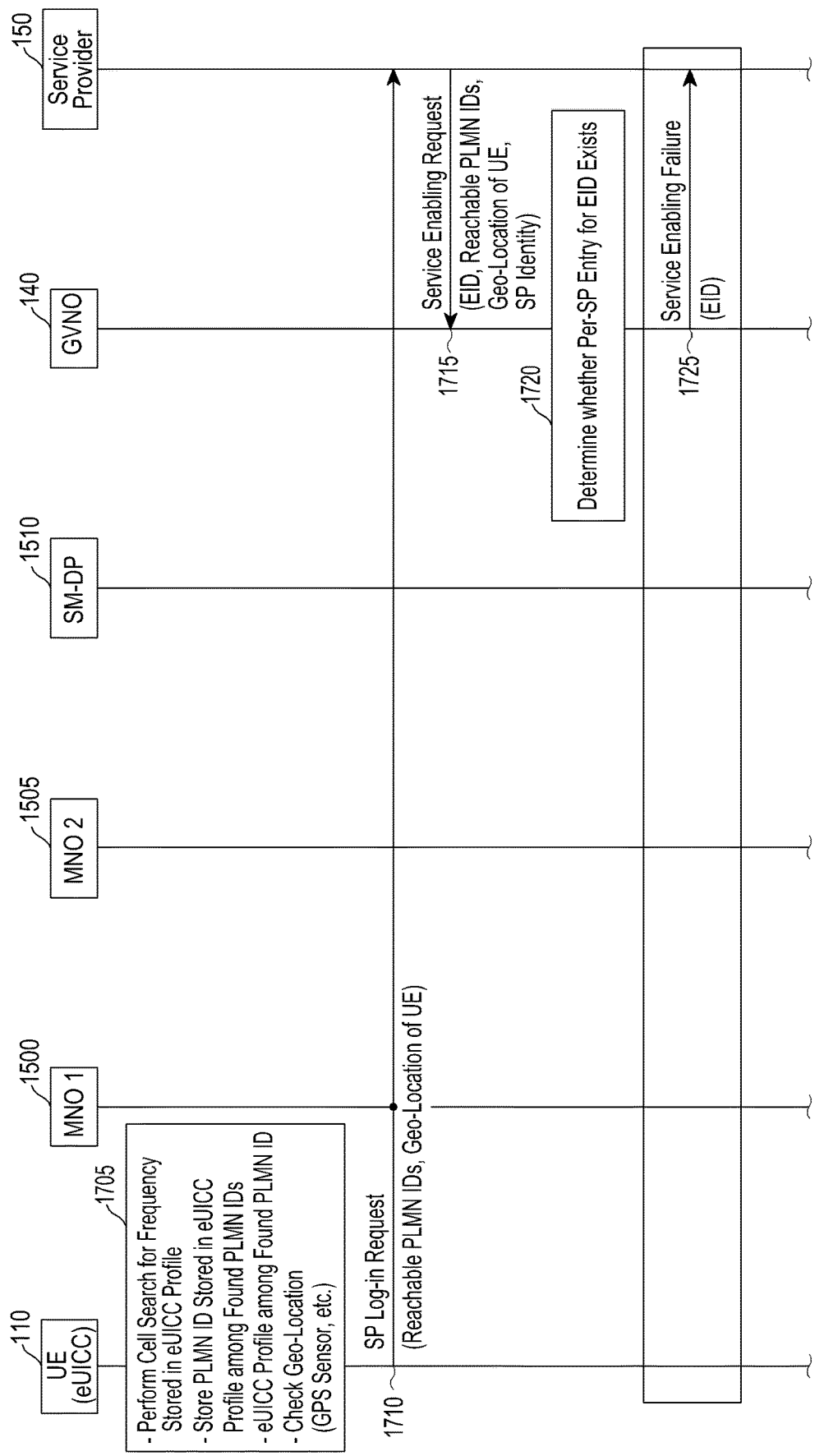
FIG. 17 (including FIGS. 17A and 17B) is a message flowchart of a procedure for activating a profile of a mobile communication network to which a UE does not subscribe according to an embodiment of the present disclosure.
Figure 17B:
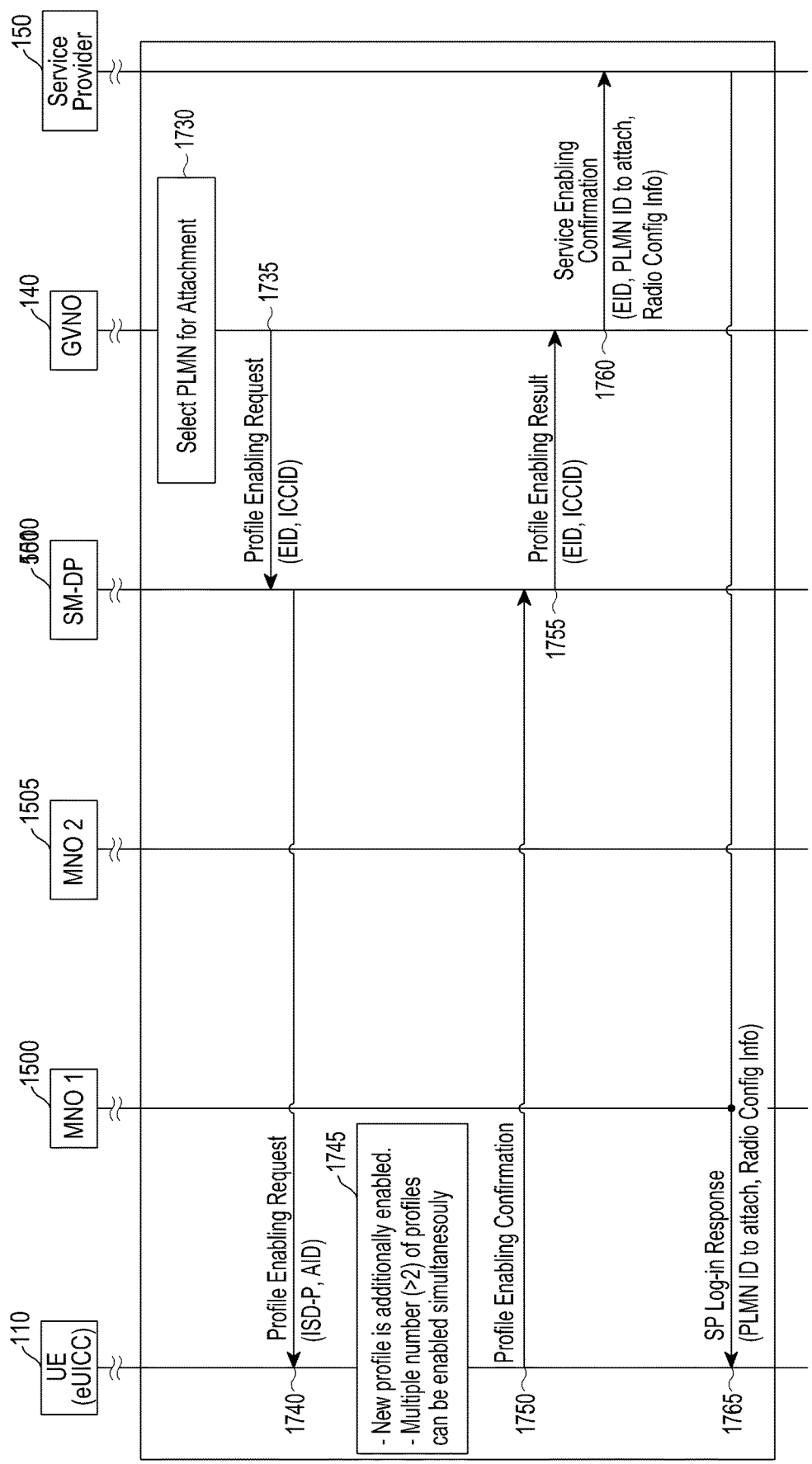

FIG. 17 (including FIGS. 17A and 17B) is a message flowchart of a procedure for activating a profile of a mobile communication network to which a UE does not subscribe according to an embodiment of the present disclosure.

Referring to FIG. 17, in operation 1705, the UE 110 performs a cell search by using the frequency information stored in the eUICC profile. The UE 110 stores, in the memory, only the PLMN ID of an MNO contracted with the GVNO 140, which is stored in the eUICC profile, among at least one PLMN IDs found by the cell search. The UE 110 finds out a current geographic location of the UE 110 by using a signal of a base station (BS) or a global positioning system (GPS) sensor.

In operation 1710, the UE 110 sends an SP Log-in Request message to the SP 150. The SP Log-in Request message may include reachable PLMN IDs of at least one MNOs which are found in the current geographic location of the UE 110 stored in operation 1705, that is, at least one MNOs to which the UE 110 may attempt to be attached, and information about the current geographic location of the UE 110.

In operation 1715, the SP 150 receives the SP Log-in Request message and delivers a Service Enabling Request message to the GVNO 140 in operation 1715. The Service Enabling Request message may include the EID obtained from the SP Log-in Request message, the reachable PLMN IDs, the geographic location of the UE 110, and also the SP ID.

In operation 1720, the GVNO 140 determines whether a Per-Service-Provider entry for the EID exists in the internal repository. If there is no Per-Service-Provider entry for the EID, it means that the procedure of FIG. 16 in which the SP 150 requests subscription to the GVNO 140 fails to be normally performed. In operation 1725, the GVNO 140 sends a Service Enabling Failure message to the SP 150 to notify that the Service Enabling Failure message corresponding to the EID may not be accepted.

On the other hand, if there is the Per-Service-Provider entry corresponding to the EID, the GVNO 140 initiates profile enabling as in operations 1730 through 1765.

More specifically, in operation 1730, the GVNO 140 selects a mobile communication network to which the UE 110 is to be attached to use the service of the SP 150. For selection of the mobile communication network, factors, such as the QoS profile of the Per-Service-Provider entry in a log-in status, a contracted cost between each MNO and the GVNO 140, a PLMN ID of an MNO with which the UE 110 has made a subscription contract, and an MNO (i.e., a sponsored PLMN) selected by the GVNO 140 to provide the service of the SP 150 to the UE 110, are taken into consideration.

The GVNO 140 sends a Profile Enabling Request message including the ED and the ICCID to the SM-SR 1510 in operation 1735, and the SM-SR 1510 sends a Profile Enabling Request message to the UE 110 in operation 1740. The Profile Enabling Request message delivered to the UE 110 may include an issuer security domain profile (ISD-P) key and an application identifier (AID).

In operation 1745, a profile of a new mobile communication network 1505 supporting sponsored data connectivity by the SP 150 as well as a profile previously activated in the eUICC of the UE 110 (that is, a profile of the mobile communication network 1500 to which the UE 110 subscribes) are activated at the same time. That is, profiles of different mobile communication networks are simultaneously activated in the eUICC. Even if a profile of another mobile communication network supporting sponsored data connectivity has already been activated, the profile of the new mobile communication network 1505 may be further activated.

In operation 1750, the UE 110 sends a Profile Enabling Confirmation message indicating that the requested profile is successfully activated to the SM-SR 1510. That is, the UE 110 uses the Profile Enabling Confirmation message that does not include a meaning of deactivation of an existing profile, instead of a Profile Switch Confirmation message having a meaning of deactivation of the existing profile and activation of a new profile.

In operation 1755, the SM-SR 1510 sends a Profile Enabling Result message for notifying activation of the profile to the GVNO 140.

In operation 1760, the GVNO 140 sends a Service Enabling Confirmation message to the SP 150 to notify that the request of the SP 150 has been processed. The Service Enabling Confirmation message may include the EID in which the profile is activated, the PLMN ID of a mobile communication network to which the UE 110 attempts to be attached, and radio information such as a frequency of the mobile communication network.

In operation 1765, the SP 150 sends an SP Log-in Response message to the UE 110 through the mobile communication network 1 1500. The SP Log-in Response message may include information provided from the GVNO 140 in operation 1760, that is, the PLMN ID of the mobile communication network to which the UE 110 attempts to be attached and the radio information of the mobile communication network.

Figure 18:
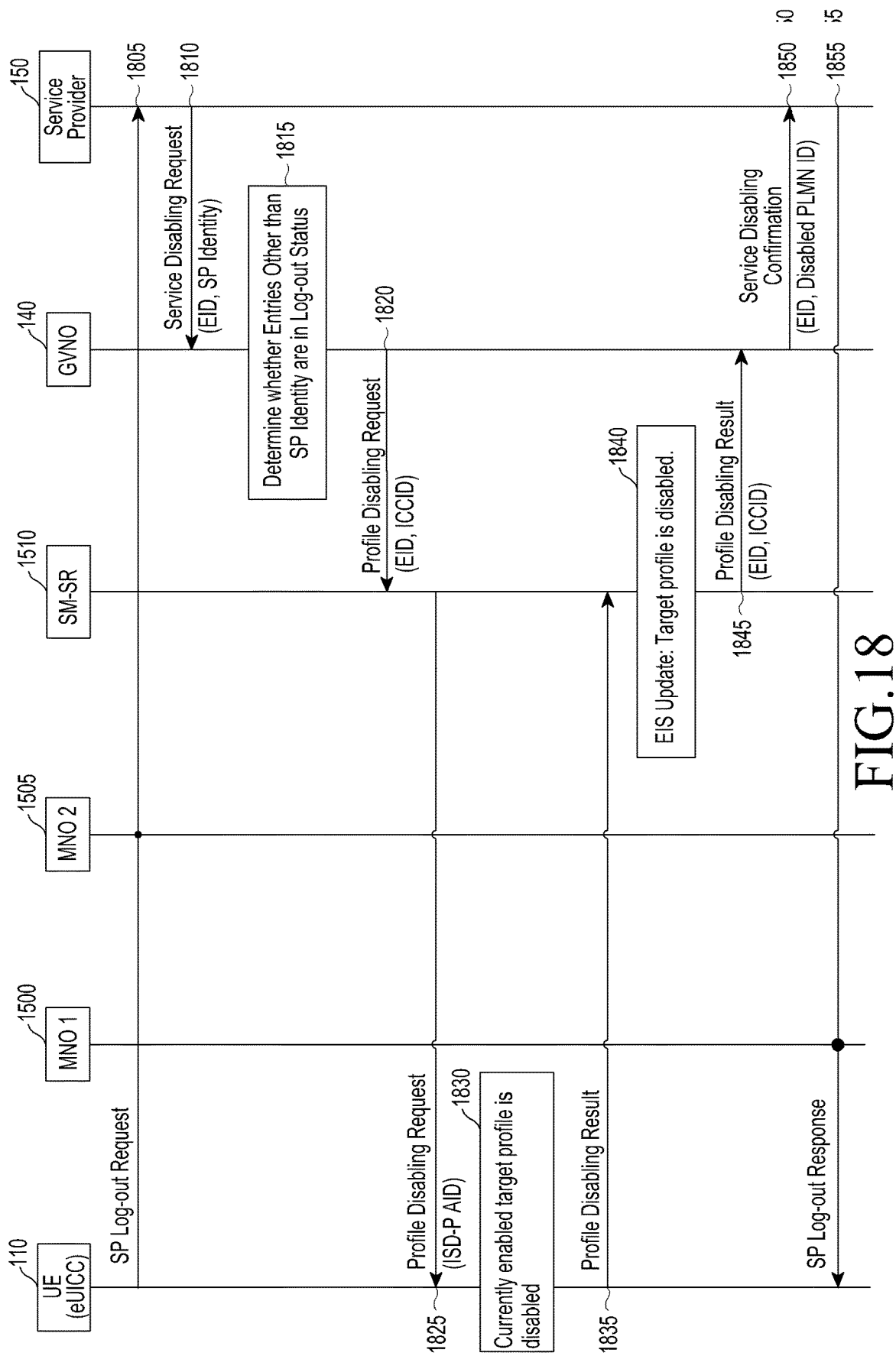
FIG. 18 is a message flowchart of a procedure for deactivating a profile of a mobile communication network to which a UE does not subscribe according to an embodiment of the present disclosure.

FIG. 18 is a message flowchart of a procedure for deactivating a profile of a mobile communication network to which a UE does not subscribe according to an embodiment of the present disclosure.

Referring to FIG. 18, in operation 1805, the UE 110 sends an SP Log-out Request message to the SP 150 to notify termination of the service. In operation 1810, the SP 150 sends a Service Disabling Request message to the GVNO 140. The Service Disabling Request message may include the EID of the UE 110 requesting service termination and an SP identity.

In operation 1815, the GVNO 140 checks the GVNO entry corresponding to the EID to determine whether the log-in status of other all Per-Service-Provider entries except for a Per-Service-Provider entry for the SP identity is a log-off status. If the log-in status of other all Per-Service-Provider entries is the log-off status, the GVNO 140 initiates deactivation after operation 1820 because the activated profile for the UE 110 does not have to be maintained. On the other hand, if there are at least one Per-Service-Provider entries that are not in the 'log-off' status, the GVNO 140 has to maintain the activated profile for the UE 110 and thus the following procedure is not performed.

Operations 1820 through 1845 mean a deactivation procedure of a profile complying with the eUICC standards.

The GVNO 140 sends a Profile Disabling Request message including the EID and the ICCID of the UE 110 to the SM-SR 1510 corresponding to the EID in operation 1820, and the SM-SR 1510 sends a Profile Disabling Request message including the ISD-P key and the AID to the UE 110 in response to reception of the Profile Disabling Request message in operation 1825. The UE 110 deactivates a profile required by the SM-SR 1510 in the eUICC in operation 1830, and returns a Profile Disabling Result message to the SM-SR 1510 in operation 1835. The SM-SR 1510 disables the deactivated profile in the UE 110 to update the EIS corresponding to the eUICC of the UE 110 in operation 1840, and sends a Profile Disable Result message including the EID and the ICCID to the GVNO 140 to report that the profile corresponding to the EID is deactivated in operation 1845.

In operation 1850, the GVNO 140 sends a Service Disabling Confirmation message to the SP 150 to notify service deactivation. The Service Disabling Confirmation message may include the EID of the profile-deactivated UE 110 and the PLMN ID of the profile-deactivated mobile communication network 1505.

In operation 1855, the SP 150 finishes the log-out procedure by sending an SP Log-out Response message to the UE 110.

Figure 19:
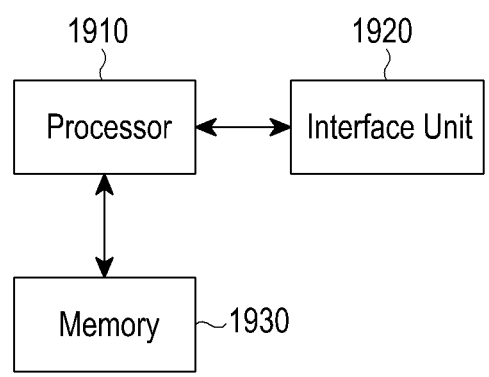
FIG. 19 is a block diagram of a network entity according to an embodiment of the present disclosure.

FIG. 19 is a block diagram of a network entity according to an embodiment of the present disclosure. The illustrated structure is applicable to the UE 110, the MME 120, the gateway 130, the GVNO 140, and the PCRF 160 operating according to at least one of the above-described embodiments.

Referring to FIG. 19, a processor 1910 communicates with another network entity through an interface unit 1920, and sends a message according to at least one of the above-described embodiments to another network entity through the interface unit 1920 or processes the message received through the interface unit 1920. The processor 1910 stores a program code, parameters, and related information used for processing messages in a memory 1930 or reads them from the memory 1930.

The embodiments of the present disclosure operating in this way enable the user or the UE that does not subscribe to the mobile communication network to use the mobile communication network to use a service of a particular SP. For example, in order for a user to connect a portable electronic(e) book terminal used by the user to a server of an e-book SP through the mobile communication network, the user may have to a cumbersome process of connecting a mobile phone to the mobile communication network by driving mobile hotspot of the mobile phone subscribing to the mobile communication network or separately purchasing a universal subscriber identification module (USIM) for data sharing and inserting the USIM into the e-book terminal. On the other hand, when the present disclosure uses the embodiments, the user may connect the e-book terminal to the e-book SP through the mobile communication network without causing the e-book terminal to subscribe to the mobile communication network.

Various embodiments of the present disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such software may be stored, whether or not erasable or re-recordable, in a volatile or non-volatile storage such as a read-only memory (ROM), a memory such as a random access memory (RAM), a memory chip, a device, or an integrated circuit; and an optically or magnetically recordable and machine (e.g., computer)-readable storage medium such as a compact disc (CD), a digital versatile disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

The embodiments disclosed in the present specification and drawings have been provided to easily describe the present disclosure and to help understanding of the present disclosure, and are not intended to limit the scope of the present disclosure. While the foregoing embodiments of the present disclosure have been shown and described as examples, it will be apparent to those of ordinary skill in the art that modifications and variations can be made without departing from the spirit and scope of the embodiments as defined by the appended claims. Therefore, the true technical scope of the present disclosure should be defined by the appended claims.

The invention claimed is:

1. A method for providing a data service through a mobile communication network, the method comprising:
providing an identity of a user equipment (UE) that is configured to perform a limited access to an equipment identity register (EIR) of a mobile network operator (MNO);
providing, to a policy and charging rules function (PCRF) of the MNO, a network entity identity of a network entity supporting sponsored data connectivity of the UE, an address to which the UE is attached through the MNO, and information about a quality of service (QoS) profile guaranteed in the MNO;
receiving, from the PCRF, a notification message comprising a usage data record of the UE;
collecting, from the UE, the usage data record collected by the UE;
verifying the usage data record collected by the PCRF based on the usage data record collected by the UE;
delivering, to a service provider (SP), an alert message comprising the usage data record collected by the PCRF;
receiving, from the SP, a token publishing message comprising information allowing additional data use for the UE; and
delivering the information allowing the additional data use for the UE to the PCRF through a profile update message,
wherein the limited access is allowed in a state where the UE does not subscribe to the MNO and the UE is allowed to perform, through a mobile communication network of the MNO, communication for authentication with the SP different from the MNO.

2. The method of claim 1, wherein the information allowing the additional data use for the UE comprises an identity of at least one MNO, a device identity of the UE, the QoS profile, a usage limit based on a re-issued token, an allowed destination internet protocol (IP) address, and an identity of the SP.

3. The method of claim 1, further comprising:
receiving, from the SP, a notification message comprising the identity of the UE and the identity of the MNO;
collecting, from the UE, a usage data record collected by the UE;
transmitting a profile delete message comprising the identity of the UE to a home subscriber server (HSS) of the MNO; and
receiving, from the PCRF, the usage data record collected for the UE as a charging data record.

4. The method of claim 1, wherein the identity of the UE is a device identity or a subscriber identity of the UE.

5. An apparatus for providing a data service through a mobile communication network, the apparatus comprising:
an interface unit configured to communicate with a mobile network operator (MNO) and a service provider (SP); and
at least one processor configured to:
provide an identity of a user equipment (UE) that is configured to perform a limited access to an equipment identity register (EIR) of the MNO,
provide, to a policy and charging rules function (PCRF) of the MNO, a network entity identity of a network entity supporting sponsored data connectivity of the UE, an address to which the UE is attached through the MNO, and information about a quality of service (QoS) profile guaranteed in the MNO,
control the interface unit to receive, from the PCRF, a notification message comprising a usage data record of the UE,
collect, from the UE, the usage data record collected by the UE,
verify the usage data record collected by the PCRF based on the usage data record collected by the UE,
control the interface unit to deliver, to the SP an alert message comprising the usage data record collected by the PCRF,
control the interface unit to receive, from the SP, a token publishing message comprising information allowing additional data use for the UE, and
control the interface unit to deliver the information allowing the additional data use for the UE to the PCRF through a profile update message,
wherein the limited access is allowed in a state where the UE does not subscribe to the MNO and the UE is allowed to perform, through a mobile communication network of the MNO communication for authentication with the SP different from the MNO.

6. The apparatus of claim 5, wherein the information allowing the additional data use for the UE comprises an identity of at least one MNO, a device identity of the UE, the QoS profile, a usage limit based on a re-issued token, an allowed destination internet protocol (IP) address, and an identity of the SP.

7. The apparatus of claim 5, wherein the at least one processor is further configured to:
- control the interface unit to receive, from the SP, a notification message comprising the identity of the UE and the identity of the MNO;
- collect, from the UE, a usage data record collected by the UE;
- control the interface unit to transmit a profile delete message comprising a device identity of the UE to a home subscriber server (HSS) of the MNO; and
- control the interface unit to receive, from the PCRF, the usage data record collected for the UE as a charging data record.

* * * * *